(12) United States Patent
Dun et al.

(10) Patent No.: US 10,324,554 B2
(45) Date of Patent: Jun. 18, 2019

(54) ARRAY SUBSTRATE AND MANUFACTURING METHOD THEREOF, TOUCH DISPLAY PANEL AND TOUCH DISPLAY APPARATUS

(71) Applicant: Shanghai AVIC OPTO Electronics Co., Ltd., Shanghai (CN)

(72) Inventors: Dongliang Dun, Shanghai (CN); Zhiqiang Xia, Shanghai (CN); Jine Liu, Shanghai (CN); Feng Qin, Shanghai (CN)

(73) Assignee: SHANGHAI AVIC OPTO ELECTRONICS CO., LTD., Shanghai (CN)

( * ) Notice: Subject to any disclaimer, the term of this patent is extended or adjusted under 35 U.S.C. 154(b) by 71 days.

(21) Appl. No.: 15/790,732

(22) Filed: Oct. 23, 2017

(65) Prior Publication Data
US 2018/0046300 A1    Feb. 15, 2018

(30) Foreign Application Priority Data
Jun. 30, 2017   (CN) .......................... 2017 1 0522390

(51) Int. Cl.
*G06F 3/045*    (2006.01)
*G06F 3/041*    (2006.01)
(Continued)

(52) U.S. Cl.
CPC .......... *G06F 3/0412* (2013.01); *G02F 1/1343* (2013.01); *G02F 1/13338* (2013.01);
(Continued)

(58) Field of Classification Search
CPC ...... G06F 3/0412; G06F 3/0414; G06F 3/045; G06F 2203/04105; G06F 2203/04103;
(Continued)

(56) References Cited

U.S. PATENT DOCUMENTS 5,828,428 A * 10/1998 Kim .................. G02F 1/136204
349/40
2013/0077002 A1* 3/2013 Yoon ................. G02F 1/136213
349/38
(Continued)

*Primary Examiner* — Ahmed N Sefer
(74) *Attorney, Agent, or Firm* — Alston & Bird LLP

(57) ABSTRACT

An array substrate, a manufacturing method, a touch display panel, a touch display apparatus are provided. The manufacturing method includes: forming a gate on a substrate; forming a first insulating layer covering the gate; forming an active layer and a sensing resistor; forming a first electrode layer covering the sensing resistor; forming a source and a drain; etching the first doped layer at a part being not overlapped with the source and the drain, reserving the first electrode layer to cover the sensing resistor; forming a second insulating layer covering the source and the drain; etching the second insulating layer at a part being overlapped with the sensing resistor to expose the first electrode layer; forming a second electrode layer, and etching the first/second electrode layer at a part where the first/second electrode layer is overlapped with the sensing resistor to expose the sensing resistor.

18 Claims, 20 Drawing Sheets

(51) Int. Cl.
*G02F 1/1333* (2006.01)
*G02F 1/1343* (2006.01)

(52) U.S. Cl.
CPC ........ *G02F 1/133345* (2013.01); *G06F 3/045* (2013.01); *G06F 3/0414* (2013.01); *G06F 2203/04103* (2013.01); *G06F 2203/04105* (2013.01)

(58) Field of Classification Search
CPC .............. G02F 1/1343; G02F 1/13338; G02F 1/133345
See application file for complete search history.

(56) References Cited

U.S. PATENT DOCUMENTS

2016/0254273 A1* 9/2016 Yu .................... G02F 1/136286
257/72
2017/0192569 A1* 7/2017 Jeon .................... G06F 3/0412

\* cited by examiner

ARRAY SUBSTRATE AND
MANUFACTURING METHOD THEREOF,
TOUCH DISPLAY PANEL AND TOUCH
DISPLAY APPARATUS

CROSS-REFERENCE TO RELATED
APPLICATIONS

This application claims priority to a Chinese patent application No. CN201710522390.2 filed on Jun. 30, 2017, the disclosure of which is incorporated herein by reference in its entirety.

TECHNICAL FIELD

Embodiments of the present disclosure relate to the technical field of display, particularly relate to an array substrate, a manufacturing method thereof, a touch display panel and a touch display apparatus.

BACKGROUND

At present, a display panel with a touch function as an information input tool is widely applied to various electronic devices, such as an information inquiry machine in a hall of a public place, as well as a computer, a mobile phone and the like used by a user in daily life and work. In this way, the user can manipulate such electronic devices only by touching icons on a touch display screen with a finger, without adopting other input devices, such as a keyboard, a mouse and the like, thereby realizing more direct and convenient man-machine interaction. heavily dopedheavily dopedheavily dopedheavily dopedheavily dopedheavily dopedheavily doped

SUMMARY

In order to better meet needs of the user, a pressure sensor for detecting a touch pressure applied by the user in a process of touching the touch display screen is generally provided in the touch display screen. The pressure sensor is capable of collecting not only touch position information but also magnitude of touch pressure, thereby expanding an application range of touch display technologies.

An array substrate generally includes a plurality of thin film transistors, and each of the thin film transistors includes a gate, an active layer, a source and a drain. In order to simplify a manufacturing process of a display panel integrated with the pressure sensor, a sensing resistor in the pressure sensor and the active layer of each of the thin film transistors are generally manufactured on the same layer. The sensing resistor in the pressure sensor and the active layer of each of the thin film transistors both include an intrinsic layer and a heavily doped layer. In a manufacturing process of the thin film transistors in the aray substrate, after forming the source and drain being patterned, the heavily doped layer of the active layer is grooved at a part, at which the heavily doped layer is not overlapped with the source and the drain, to etch off a conducting channel between the source and the drain corresponding to the active layer, thereby avoiding a short circuit between the source and the drain due to the heavily doped layer, which is adjacent to the source and the drain, of the active layer. However, the heavily doped layer in the pressure sensor will be etched off in the process of etching the conducting channel if the heavily doped layer in the pressure sensor is not blocked from being etched, so that the pressure sensor fails to work normally, i.e., the display panel fails to perform pressure sensing. In order to ensure to reserve the heavily doped layer in the pressure sensor in the process of etching the conducting channel, a masking process will be inevitably added, thereby enabling a manufacturing process of the display panel to be complicated and increasing manufacturing cost of the display panel.

In view of the above, the present disclosure provides an array substrate, a manufacturing method, a touch display panel and a touch display apparatus. Compared with the existing art, a masking process during manufacture of a display panel is omitted by utilizing a first electrode layer, and a manufacturing process of the touch display panel is simplified and manufacturing cost of the touch display panel is reduced while ensuring that a pressure sensor in the display panel can normally work.

In a first aspect, embodiments of the present disclosure provide a manufacturing method of an array substrate, including:
providing a substrate;
forming a gate of a thin film transistor on the substrate;
forming a first insulating layer covering the gate;
forming an active layer of the thin film transistor and a sensing resistor of a pressure sensor, the sensing resistor and the active layer are manufactured on the same layer, in a direction facing away from the substrate, the active layer includes a first doped layer and a first intrinsic layer, and the sensing resistor includes a second doped layer and a second intrinsic layer, the first doped layer and the second doped layer are manufactured on the same layer, and the first intrinsic layer and the second intrinsic layer are manufactured on the same layer;
forming a first electrode layer covering the sensing resistor;
forming a source and a drain of the thin film transistor;
etching at a part, which is not overlapped with the source and the drain, of the first doped layer, and reserving the first electrode layer to cover the sensing resistor;
forming a second insulating layer covering the source and the drain;
etching a part, which is overlapped with the sensing resistor, of the second insulating layer, so as to expose the first electrode layer covering the sensing resistor; and
forming a second electrode layer, and etching a part, which is overlapped with the sensing resistor, of the first electrode layer and etching a part, which is overlapped with the sensing resistor, of the second electrode layer, so as to expose the sensing resistor.

In a second aspect, embodiments of the present disclosure further provide an array substrate. The array substrate includes a substrate and a plurality of thin film transistors positioned on the substrate. Each of the thin film transistors includes a gate, a first insulating layer, an active layer as well as a source and a drain in a direction facing away from the substrate. The source and the drain are manufactured on the same layer. A second insulating layer covers the source and the drain. A plurality of pressure sensors are positioned on the substrate. Each of the pressure sensors includes a sensing resistor. The sensing resistor and the active layer are manufactured on the same layer. In the direction facing away from the substrate, the active layer includes a first doped layer and a first intrinsic layer, and the sensing resistor includes a second doped layer and a second intrinsic layer. The first doped layer and the second doped layer are positioned on the same layer, and the first intrinsic layer and the second intrinsic layer are positioned on the same layer. A first electrode layer is positioned between the first insulating layer and a second insulating layer. A second electrode layer is positioned on one side, facing away from the substrate, of the second insulating layer. The second insulating layer has a through hole, and the sensing resistor's vertical projection on the substrate is positioned in the through hole's vertical projection of on the substrate.

In a third aspect, embodiments of the present disclosure further provide a touch display panel including the array substrate provided in the second aspect.

In a fourth aspect, embodiments of the present disclosure further provide a touch display apparatus including the touch display panel provided in the third aspect.

Embodiments of the present disclosure provide the array substrate, the manufacturing method, the touch display panel and the touch display apparatus. The sensing resistor of the pressure sensor and the active layer of the thin film transistor are manufactured on the same layer, and the formed first electrode layer covers the sensing resistor of the pressure sensor before a part, which is not overlapped with the source and the drain, of the first doped layer is etched in the manufacturing process of the array substrate, so that the first electrode layer performs a function of blocking etching the first doped layer in the sensing resistor of the pressure sensor when the part, which is not overlapped with the source and the drain, of the first doped layer is etched. Moreover, the first electrode layer covering the sensing resistor of the pressure sensor can be etched off when the second electrode layer is etched, thereby preventing the second doped layer in the sensing resistor of the pressure sensor from being etched without using additional mask process. Relative to the existing art, one masking process during manufacture of the display panel is omitted with the first electrode layer, and the manufacturing process of the touch display panel is simplified and the manufacturing cost of the touch display panel is reduced while ensuring that the pressure sensor in the display panel can normally work.

BRIEF DESCRIPTION OF DRAWINGS

Other features, objectives and advantages of the present application will become more apparent by reading detailed description of non-limiting embodiments made with reference to the following drawings.

DETAILED DESCRIPTION

Figure 1:
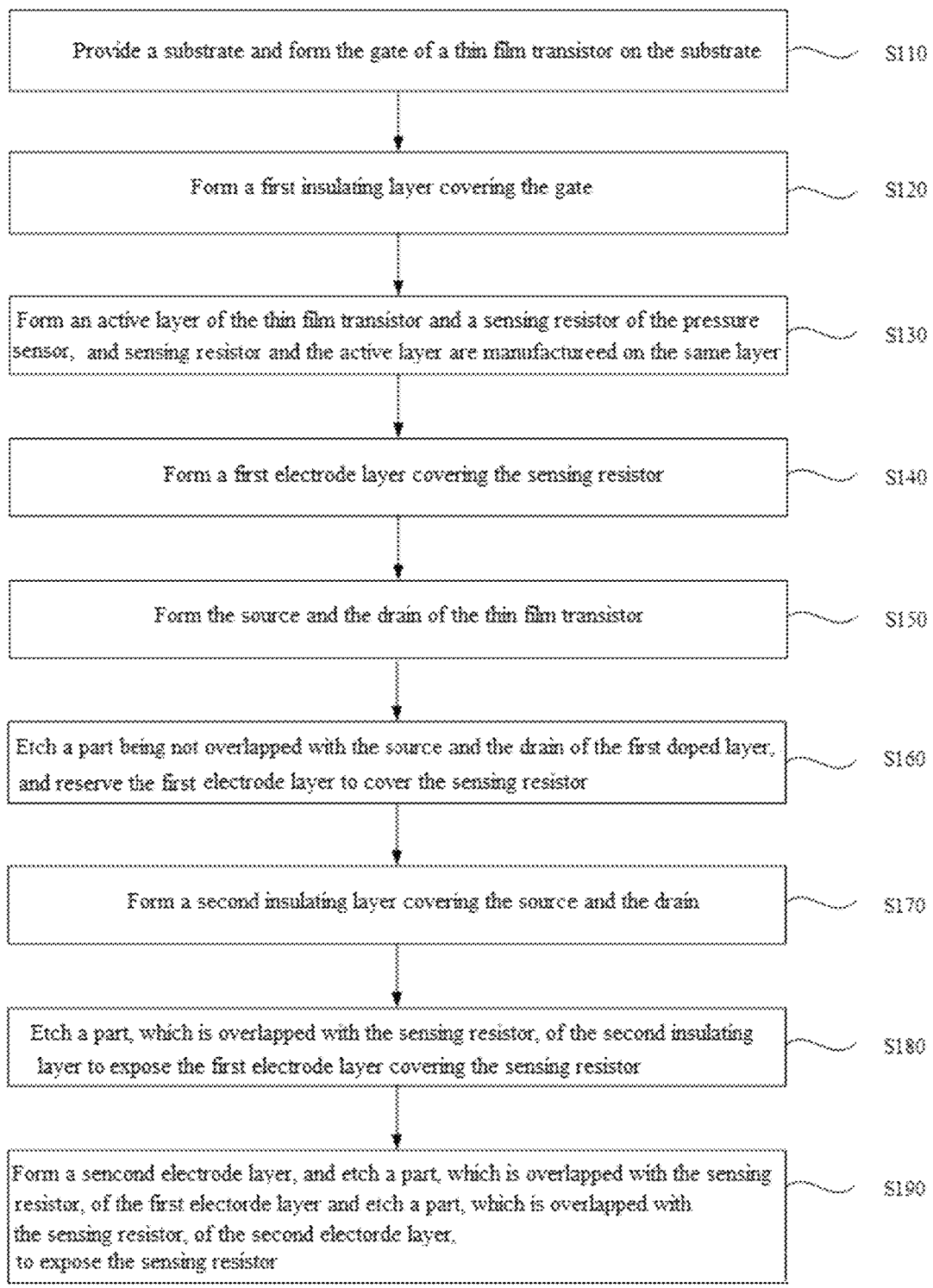
FIG. 1 is a schematic flow chart illustrating a manufacturing method of an array substrate provided by embodiments of the present disclosure.

The present disclosure is further described below in detail in combination with drawings and embodiments. It can be understood that specific embodiments described herein are only used for illustrating the present disclosure rather than limiting the present disclosure. In addition, it should be further noted that only parts related to the present disclosure rather than all structures are illustrated in drawings for convenient description. Throughout the description, the same or similar reference numerals represent the same or similar structures, elements or flows. It should be noted that embodiments in the present application and features in embodiments can be mutually combined without conflict.

Embodiments of the present disclosure provide a manufacturing method of an array substrate. The manufacturing method includes: providing a substrate; forming a gate of a thin film transistor on the substrate; forming a first insulating layer covering the gate; forming an active layer of the thin film transistor and a sensing resistor of a pressure sensor, and the sensing resistor and the active layer are manufactured on the same layer, in a direction facing away from the substrate, the active layer includes a first doped layer and a first intrinsic layer and the sensing resistor includes a second doped layer and a second intrinsic layer, and the first doped layer and the second doped layer are manufactured on the same layer, and the first intrinsic layer and the second intrinsic layer are manufactured on the same layer; forming a first electrode layer covering the sensing resistor; forming a source and a drain of the thin film transistor; etching a part, which is not overlapped with the source and the drain, of the first doped layer and reserving the first electrode layer to cover the sensing resistor; forming a second insulating layer covering the source and the drain; etching a part, which is overlapped with the sensing resistor, of the second insulating layer, to expose the first electrode layer covering the sensing resistor; and forming a second electrode layer, and etching a part, which is overlapped with the sensing resistor, of the first electrode layer and etching a part, which is overlapped with the sensing resistor, of the second electrode, to expose the sensing resistor.

When the sensing resistor in the pressure sensor and the active layer of the thin film transistor are manufactured on the same layer, in a process of manufacturing the thin film transistors in the array substrate, after source and drain being patterned are formed, the heavily doped layer of the active layer is grooved at a part, at which the heavily doped layer is not overlapped with the source and the drain, to etch off a conducting channel between the source and the drain corresponding to the active layer, thereby avoiding a short circuit between the source and the drain due to the heavily doped layer, which is adjacent to the source and the drain, of the active layer. However, the heavily doped layer in the pressure sensor will be etched off in the process of etching the conducting channel if the heavily doped layer in the pressure sensor is not blocked from being etched, so that the pressure sensor fails to work normally, i.e., the display panel fails to perform pressure sensing. In order to ensure to reserve the heavily doped layer in the pressure sensor in the process of etching the conducting channel, a masking process will be inevitably added, thereby enabling a manufacturing process of the display panel to be complicated and increasing manufacturing cost of the display panel.

According to embodiments of the present disclosure, the sensing resistor of the pressure sensor and the active layer of the thin film transistor are manufactured on the same layer. In the manufacturing process of the array substrate, the formed first electrode layer covers the sensing resistor of the pressure sensor before a part, which is not overlapped with the source and the drain, of the first doped layer is etched. In this way, the first electrode layer performs a function of blocking etching the first doped layer in the sensing resistor of the pressure sensor when at the part, which is not overlapped with the source and the drain, of the first doped layer is etched. Moreover, the first electrode layer covering the sensing resistor of the pressure sensor can be etched off where the second electrode layer is etched, thereby preventing the second doped layer in the sensing resistor of the pressure sensor from being etched without using additional mask process. Relative to the existing art, one masking process during manufacture of the display panel is omitted with the first electrode layer, and the manufacturing process of the touch display panel is simplified and the manufacturing cost of the touch display panel is reduced while ensuring that the pressure sensor in the display panel can normally work.

The above description is a core concept of the present disclosure. Technical solutions in embodiments of the present disclosure will be clearly and completely described below in combination with drawings in embodiments of the present disclosure. Based on embodiments in the present disclosure, all other embodiments obtained by those ordinary skilled in the art belong to a protection scope of the present disclosure on premise of not contributing creative labor.

FIG. 1 is an exemplary schematic flow chart illustrating a manufacturing method of an array substrate provided by embodiments of the present disclosure. As shown in FIG. 1, the manufacturing method includes steps described below.

In S110, a substrate is provided, and a gate of a thin film transistor is formed on the substrate.

Figure 2A:
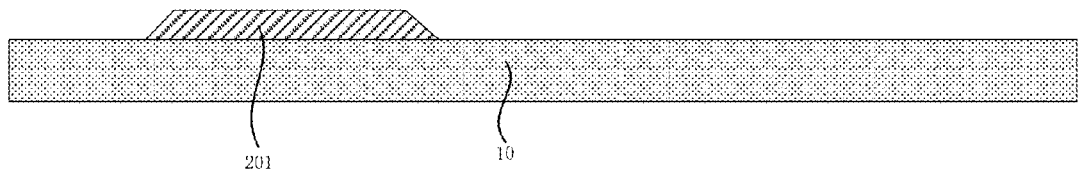
FIG. 2a is a schematic sectional diagram illustrating a structure of an array substrate corresponding to a step in FIG. 1.

As shown in FIG. 2a, a substrate 10 is provided, and a gate 201 of the thin film transistor is formed on the substrate 10. In one embodiment, a gate layer is formed on the substrate 10 through physical or chemical vapor deposition methods and the like, and then the gate 201 of the thin film transistor is formed by performing a patterning process on the gate layer, e.g., the gate layer is sequentially subjected to a photoresist spin-coating process, an exposing process, a developing process and an etching process.

In S120, a first insulating layer covering the gate is formed.

Figure 2B:
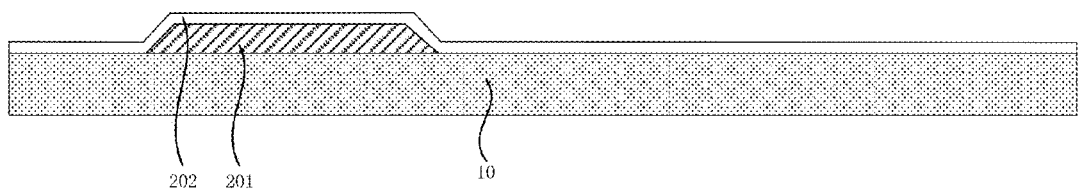
FIG. 2b is a schematic sectional diagram illustrating a structure of an array substrate corresponding to a step in FIG. 1.

As shown in FIG. 2b, a first insulating layer 202 covering the gate 201 is formed on the gate 201. The first insulating layer 202 is made of $SiO_2$ or $SiN_x$, or a combination of $SiO_2$ and $SiN_x$. In one embodiment, the first insulating layer 202 is manufactured through a plasma enhanced chemical vapor deposition method. The plasma enhanced chemical vapor deposition needs a low deposition temperature and has little influence on the structure and physical property of the film. Therefore, the film formed has good thickness and component uniformity, and is dense and has high adhesion power.

In S130, an active layer of the thin film transistor and a sensing resistor of a pressure sensor are formed, and the sensing resistor and the active layer are manufactured on the same layer.

Figure 2C:
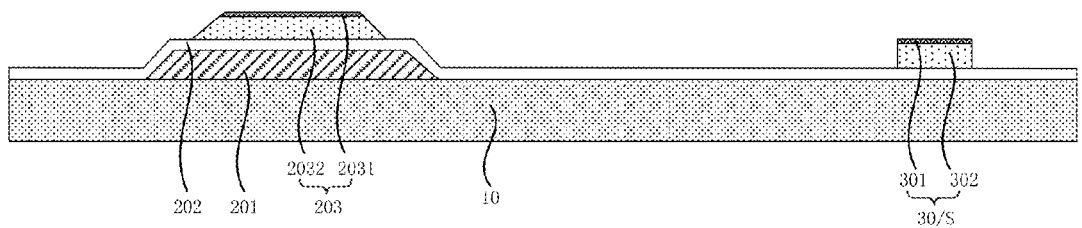
FIG. 2c is a schematic sectional diagram illustrating a structure of an array substrate corresponding to a step in FIG. 1.

As shown in FIG. 2c, an active layer 203 of the thin film transistor and a sensing resistor 30 of a pressure sensor S are formed on the first insulating layer 202. In a direction facing away from the substrate 10, the active layer 203 includes a first intrinsic layer 2032 and a first doped layer 2031, and the sensing resistor 30 of the pressure sensor S includes a second intrinsic layer 302 and a second doped layer 301. The sensing resistor 30 of the pressure sensor S and the active layer 203 of the thin film transistor are manufactured on the same layer, i.e., the first doped layer 2031 of the active layer 203 and the second doped layer 301 of the sensing resistor 30 are manufactured on the same layer, and the first intrinsic layer 2032 of the active layer 203 and the second intrinsic layer 302 of the sensing resistor 30 are manufactured on the same layer. In this way, a manufacturing process of the touch display panel is simplified while the pressure sensor is integrated in the touch display panel.

Optionally, materials for forming the sensing resistor 30 of the pressure sensor S and the active layer 203 of the thin film transistor may include amorphous silicon materials. The first doped layer 2031 of the active layer 203 and the second doped layer 301 of the sensing resistor 30 may be N-type semiconductor layers. For example, the amorphous silicon materials are doped with group-V elements (such as arsenic or antimony) to obtain N-type semiconductors. The second doped layer 301 of the sensing resistor 30 of the pressure sensor S is heavily doped, so that conductivity of the sensing resistor 30 of the pressure sensor S is increased. As for the same pressure applied to the touch display panel and magnitude of an electric signal generated by the pressure sensor S, the sensitivity of pressure detection of the touch display panel is further improved.

In S140, a first electrode layer covering the sensing resistor is formed.

Figure 2D:
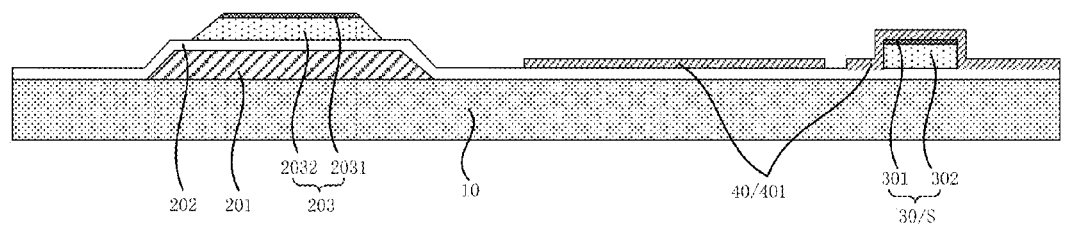
FIG. 2d is a schematic sectional diagram illustrating a structure of an array substrate corresponding to a step in FIG. 1.

As shown in FIG. 2*d*, a first electrode layer 40 is formed to cover the sensing resistor 30 of the pressure sensor S. It should be noted that a manner of covering the sensing resistor 30 of the pressure sensor S by the first electrode layer 40 is not limited in embodiments of the present disclosure as long as the first electrode layer 40 covers the sensing resistor 30 of the pressure sensor S from the right above which is far away from the substrate 10.

In S150, a source and a drain of the thin film transistor are formed.

Figure 2E:
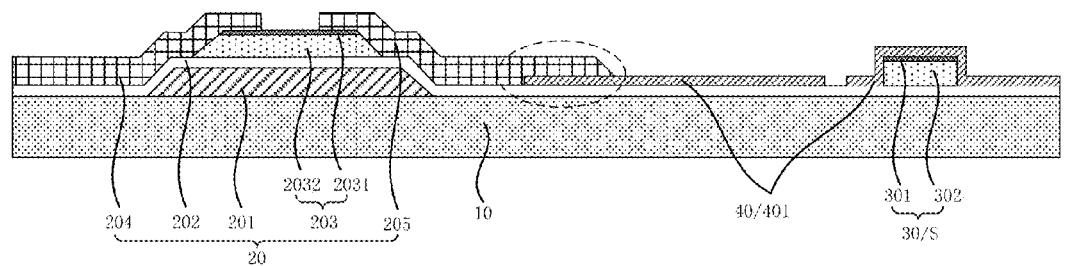
FIG. 2e is a schematic sectional diagram illustrating a structure of an array substrate corresponding to a step in FIG. 1.

As shown in FIG. 2*e*, a source 204 and a drain 205 of a thin film transistor 20 are formed on the active layer 203 of the thin film transistor. In one embodiment, first a source/drain metal film is formed on the active layer 203 and then patterned to form the source 204 and the drain 205 of the thin film transistor 20.

Optionally, the first electrode layer 40 is a pixel electrode layer, and includes a plurality of first electrodes 401, i.e., pixel electrodes. Each of the first electrodes 401 is directly and electrically connected with the drain 205 of a corresponding thin film transistor at a position indicated by a dashed box in FIG. 2*e*. With reference to FIG. 2*e*, in a process of forming the source 204 and the drain 205 of the thin film transistor 20, the drain 205 of the thin film transistor 20 is enabled to be contacted with first electrode 401 in the first electrode layer 40, thereby realizing electrical connection between the drain 205 of the thin film transistor 20 and the first electrode 401, i.e., the pixel electrode. The source 204 of the thin film transistor 20 is electrically connected with a data line (not shown), and the gate 201 is electrically connected with a scanning line (not shown). The thin film transistor 20 is operable to be turned on or turned off through a scanning signal transmitted on the scanning line, and then a display data signal is transmitted to the first electrodes 401 (i.e., the pixel electrode) through the source 204 and the drain 205 of the thin film transistor 20 by controlling the data line, thereby ensuring that the touch display panel realizes a display function.

In S160, a part, which is not overlapped with the source and the drain of the thin film transistor, of the first doped layer is etched, and the first electrode layer is still reserved to cover the sensing resistor.

Figure 2F:
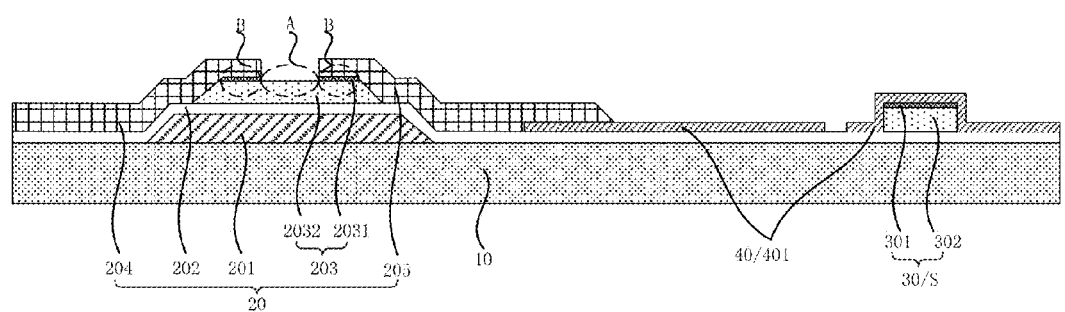
FIG. 2f is a schematic sectional diagram illustrating a structure of an array substrate corresponding to a step in FIG. 1.

As shown in FIG. 2*f*, the first doped layer 2031 of the active layer 203 includes part B and part A. Part B is overlapped with the source 204 and the drain 205 of the thin film transistor 20, and part A is not overlapped with the source 204 and the drain 205 of the thin film transistor 20. Part A of the first doped layer 2031 in the active layer 203, i.e., the part not overlapped with the source 204 and the drain 205 of the thin film transistor 20, is etched. That is, a conducting channel enabling the source 204 and the drain 205 of the thin film transistor 20 to form a short circuit is etched off, thereby ensuring normal work of the thin film transistor 20. Meanwhile, the first electrode 40 is reserved to still cover the sensing resistor 30 after the etching step is executed. That is to say, the above phase "a part, which is not overlapped with the source and the drain, of the first doped layer is etched" means that part A, which is not overlapped with the source 204 and the drain 205 of the thin film transistor 20, of the first doped layer 2031 is etched, without etching the second doped layer 301 above the sensing resistor 30.

Optionally, the part, which is not overlapped with the source 204 and the drain 205 of the thin film transistor 20, of the first doped layer 2031 may be etched through a dry etching process. Materials for forming the source 204 and the drain 205 of the thin film transistor 20 are generally metal materials, and the first doped layer 2031 of the active layer 203 is made of an amorphous silicon material doped with an N-type semiconductor material. That is, the first doped layer 2031 of the active layer 203 is a semiconductor material. Through the dry etching process, the semiconductor material generally can be etched off, while a metal oxide material cannot be etched off. Therefore, the part, which is not overlapped with the source 204 and the drain 205 of the thin film transistor 20, of the first doped layer 2031 can be effectively etched off through the dry etching process. In addition, since the first electrode layer 40 covering the sensing resistor 30 of the pressure sensor S is generally made of indium tin oxide and the like, the first electrode layer 40 will not be etched off through the dry etching process.

Compared with the existing art, the first electrode layer 40 in the touch control display panel performs a function of blocking etching the sensing resistor 30 of the pressure sensor S, i.e., the second doped layer 301 in the sensing resistor 30 of the pressure sensor S is prevented from being etched off in the dry etching process. Moreover, another mask step provided in the existing art is not needed, so that the manufacturing process of the touch display panel is simplified and the manufacturing cost of the touch display panel is reduced while ensuring that the pressure sensor S in the display panel can normally work.

In S170, a second insulating layer covering the source and the drain is formed.

Figure 2G:
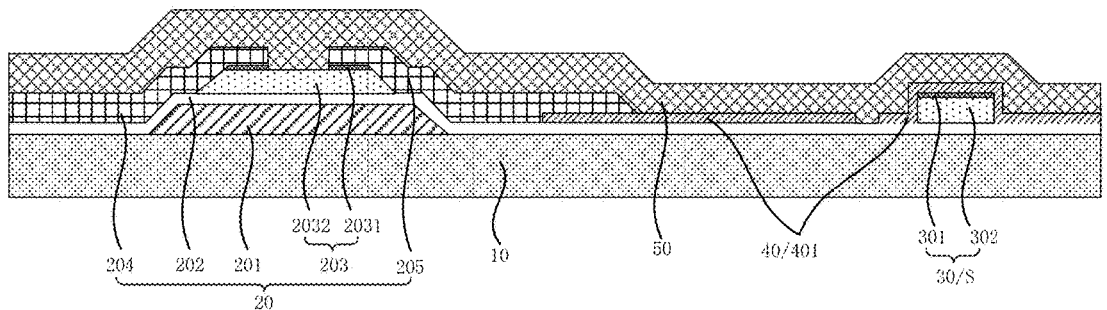
FIG. 2g is a schematic sectional diagram illustrating a structure of an array substrate corresponding to a step in FIG. 1.

As shown in FIG. 2*g*, a second insulating layer 50 covering the source 204 and the drain 205 is formed above the source 204 and the drain 205 of the thin film transistor 20, and the second insulating layer 50 covers the first electrode layer 40. In one embodiment, the second insulating layer 50 may also be formed through the physical or chemical vapor deposition method and the like. For example, the second insulating layer 50 is made of $SiO_2$ or $SiN_x$, or a combination of $SiO_2$ and $SiN_x$.

In S180, a part, which is overlapped with the sensing resistor, of the second insulating layer is etched, so as to expose the first electrode layer covering the sensing resistor.

Figure 2H:
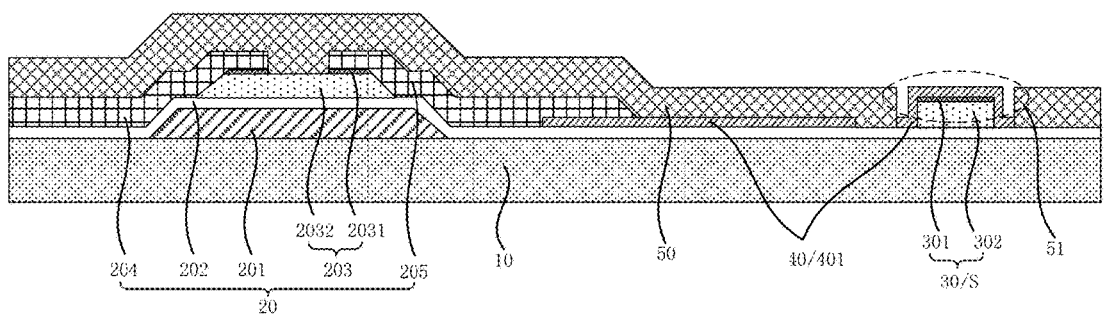
FIG. 2h is a schematic sectional diagram illustrating a structure of an array substrate corresponding to a step in FIG. 1.

As shown in FIG. 2*h*, the second insulating layer 50 includes a part (a position indicated by the dashed box in FIG. 2*h*) which is overlapped with the sensing resistor 30 of the pressure sensor S, and the part, which is overlapped with the sensing resistor 30, of the second insulating layer 50 is etched to expose the first electrode layer 40 covering the sensing resistor 30 of the pressure sensor S.

Optionally, the part being etched off of the second insulating layer 50 has a vertical projection on the substrate 10, and the projection covers the sensing resistor 30's vertical projection on the substrate 10. Specifically, as shown in FIG.

2h, a through hole 51 will be formed in the second insulating layer 50 after the part, which is overlapped with the sensing resistor 30, of the second insulating layer 50 is etched off. A size of the through hole 51 formed by etching the second insulating layer 50 is not limited herein as long as the through hole 51's vertical projection on the substrate 10 can cover the vertical projection of the sensing resistor 30 of the pressure sensor S on the substrate 10.

In S190, a second electrode layer is formed, and a part, which is overlapped with the sensing resistor, of the first electrode layer and a part, which is overlapped with the sensing resistor, of the second electrode layer are etched to expose the sensing resistor.

Figure 2I:
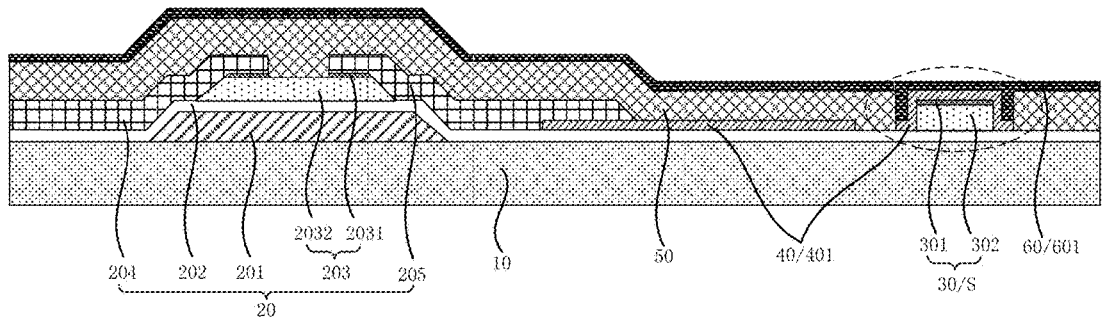
FIG. 2i is a schematic sectional diagram illustrating a structure of an array substrate corresponding to a step in FIG. 1.
Figure 2J:
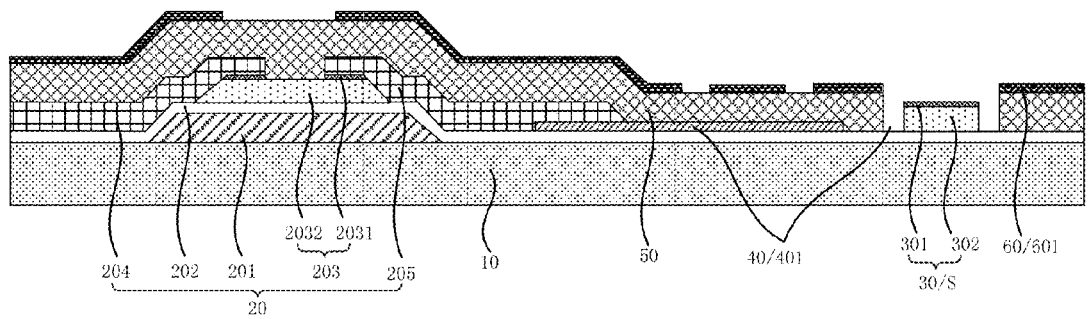
FIG. 2j is a schematic sectional diagram illustrating a structure of an array substrate corresponding to a step in FIG. 1.

As shown in FIG. 2i, a second electrode layer 60 is formed on the second insulating layer 50. In one embodiment, the second electrode layer 60 is similarly formed on the second insulating layer 50 through the physical or chemical vapor deposition method and the like. With reference to FIG. 2i, since the through hole 51's vertical projection on the substrate 10 covers the vertical projection of the sensing resistor 30 on the substrate 10 is formed when the second insulating layer 50 is etched, the first electrode layer 40 and the second electrode layer 60 are contacted with each other above the sensing resistor 30 of the pressure sensor S. Looking at FIG. 2i and FIG. 2j in combination, the sensing resistor 30 of the pressure sensor S includes a part (a position indicated by the dashed box in FIG. 2i) overlapped with both the first electrode layer 40 and the second electrode layer 60, and the part overlapped with the sensing resistor 30 of the first electrode layer 40 and the part overlapped with the sensing resistor 30 of the second electrode layer 60 are etched. In one embodiment, as shown in FIG. 2j, the second electrode layer 60 is simultaneously subjected to the patterning process to form a patterned second electrode 601.

Optionally, the part, which is overlapped with the sensing resistor 30 of the pressure sensor S, of the first electrode layer 40 and the part, which is overlapped with the sensing resistor 30 of the pressure sensor S, of the second electrode layer 60 are etched through a wet etching process. Since the first electrode layer 40 and the second electrode layer 60 are generally made of metal oxide such as indium tin oxide, the part, which is overlapped with the sensing resistor 30 of the pressure sensor S, of the first electrode layer 40 and the part, which is overlapped with the sensing resistor 30 of the pressure sensor S, of the second electrode layer 60 can be effectively etched off through the wet etching process. The sensing resistor 30 is made of amorphous silicon semiconductor materials, and the second doped layer 301 is also made of amorphous silicon materials doped with N-type semiconductor materials, thus the sensing resistor 30 will not be etched through the wet etching process. After the part, which is overlapped with the sensing resistor 30, of the first electrode layer 40 and the part, which is overlapped with the sensing resistor 30, of the second electrode layer 60 are etched off, the sensing resistor 30 of the pressure sensor S is exposed. In one embodiment, the second electrode layer 60 may be a common electrode layer when the first electrode layer 40 is the pixel electrode layer.

Figure 3:
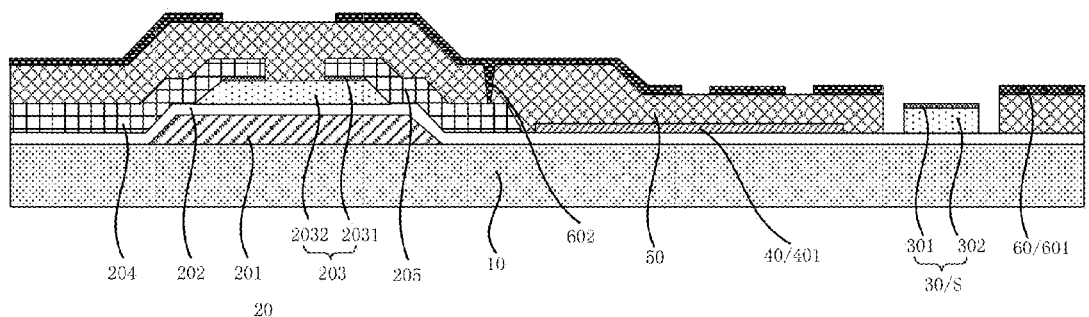
FIG. 3 is a schematic sectional diagram illustrating a structure of another array substrate provided by embodiments of the present disclosure.

FIG. 2e-2j only illustrate embodiments wherein the first electrode layer 40 is the pixel electrode layer and each of the first electrodes 401 in the first electrode layer 40 is directly and electrically connected with the drain 205 of the corresponding thin film transistor. Alternatively, the second electrode layer 60 may be provided as the pixel electrode layer. As shown in FIG. 3, the second electrode layer 60 includes a plurality of second electrodes 601, and each of the second electrodes 601 is electrically connected with the drain 205 of the corresponding thin film transistor 20 by a through hole 602 penetrating the second insulating layer 50. Similarly, the source 204 of the thin film transistor 20 is electrically connected with a data line (not shown in FIG. 3), the gate 201 is electrically connected with a scanning line (not shown in FIG. 3).The thin film transistor 20 is controlled to be turned on or turned off through a scanning signal transmitted on the scanning line, and then a display data signal is transmitted to the second electrodes, i.e., the pixel electrodes, through the source 204 and the drain 205 of the thin film transistor 20 from the data line, thereby ensuring that the touch display panel realizes a display function. In this case, the first electrode layer 40 may be the common electrode layer.

Figure 4:
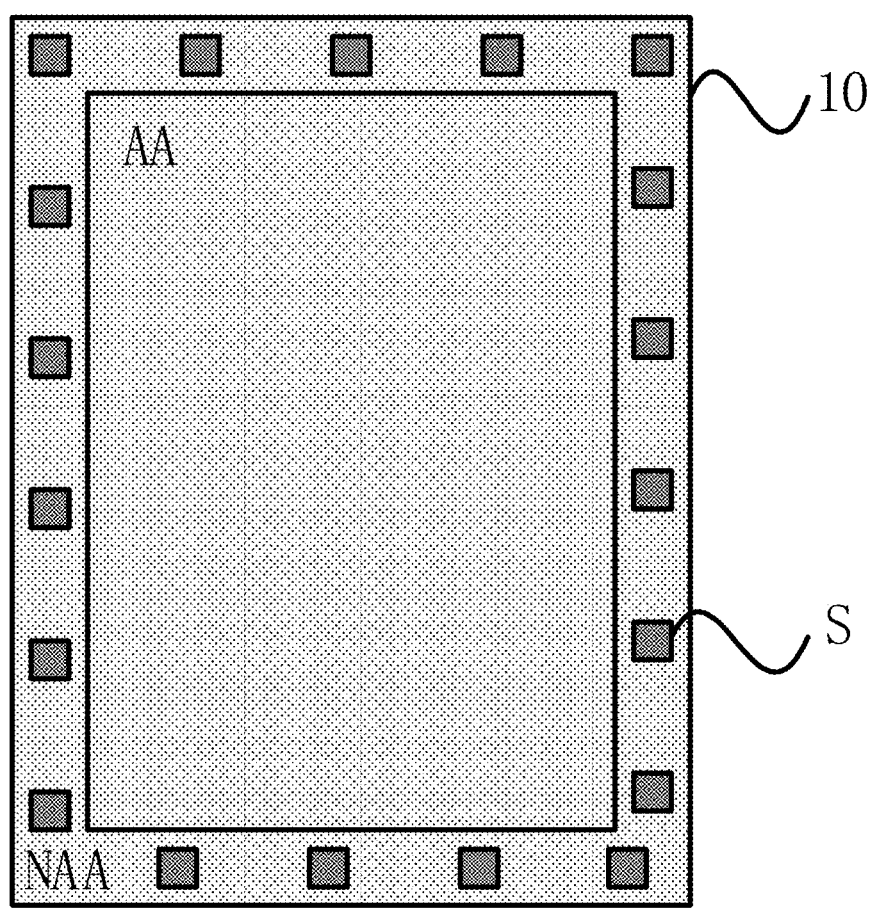
FIG. 4 is a schematic top diagram illustrating a structure of an array substrate provided by embodiments of the present disclosure.

FIG. 4 is a schematic top diagram illustrating a structure of an array substrate provided by embodiments of the present disclosure. As shown in FIG. 4, the substrate 10 includes a display region AA and a peripheral circuit region NAA surrounding the display region. The array substrate includes a plurality of thin film transistors (not shown in FIG. 4) and at least one pressure sensor S. The thin film transistors are located in the display region AA or the peripheral circuit region NAA, and the pressure sensor S is located in the peripheral circuit region NAA.

Figure 5:
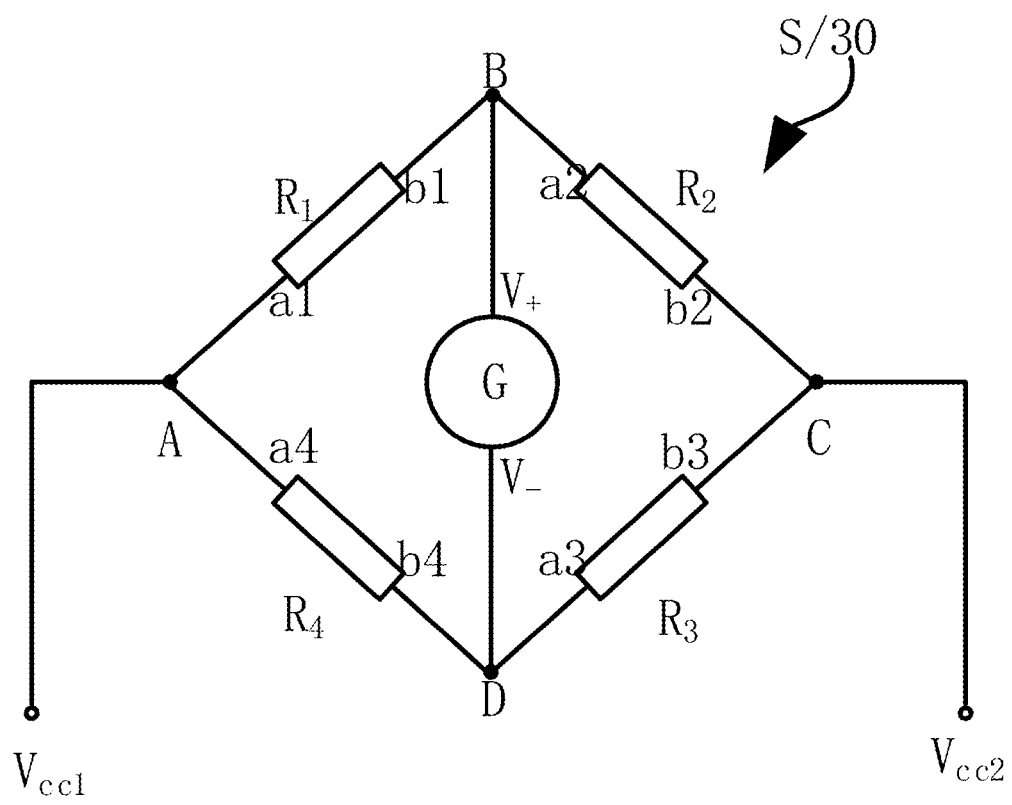
FIG. 5 is a schematic diagram illustrating a structure of a sensing resistor of a pressure sensor provided by embodiments of the present disclosure.

Optionally, FIG. 5 is a schematic diagram illustrating a structure of a sensing resistor of a pressure sensor provided by embodiments of the present disclosure. As shown in FIG. 5, the sensing resistor 30 of each pressure sensor S includes a first sensing resistor $R_1$, a second sensing resistor $R_2$, a third sensing resistor $R_3$ and a fourth sensing resistor $R_4$. A first end "a1" of the first sensing resistor $R_1$ and a first end "a4" of the fourth sensing resistor $R_4$ are electrically connected with a first power input terminal "$V_{cc1}$"; a second end "b1" of the first sensing resistor $R_1$ and a first end "a2" of the second sensing resistor $R_2$ are electrically connected with a first sensing signal measurement terminal "$V_+$"; a second end "b4" of the fourth sensing resistor $R_4$ and a first end "a3" of the third sensing resistor $R_3$ are electrically connected with a second sensing signal measurement terminal "$V_-$"; and a second end "b2" of the second sensing resistor $R_2$ and a second end "b3" of the third sensing resistor $R_3$ are electrically connected with a second power input terminal "$V_{cc2}$". Exemplarily, for example, a voltage input by the first power input terminal "$V_{cc1}$" is a positive voltage, a voltage input by the second power input terminal "$V_{cc2}$" is a negative voltage or a zero voltage, and for example, the second power input terminal "$V_{cc2}$" may be grounded.

In one embodiment, the pressure sensor illustrated in FIG. 5 is of a Wheatstone bridge structure. The first sensing resistor $R_1$, the second sensing resistor $R_2$, the third sensing resistor $R_3$ and the fourth sensing resistor $R_4$ are connected to form a quadrangle ABCD and are called as four arms of the bridge. The diagonal BD of the quadrangle ABCD is connected with a galvanometer G, and two poles of the galvanometer G are the first sensing signal measurement terminal "$V_+$" and the second sensing signal measurement terminal "$V_-$" respectively. The diagonal AC of the quadrangle ABCD is connected with the first power input terminal "$V_{cc1}$" and the second power input terminal "$V_{cc2}$". When a certain difference exists between the voltage on the first power input terminal "$V_{cc1}$" and the voltage on the second power input terminal "$V_{cc2}$", current passes through each branch in the bridge circuit. When the first sensing resistor $R_1$, the second sensing resistor $R_2$, the third sensing resistor $R_3$ and the fourth sensing resistor $R_4$ meet $$\frac{R1}{R2} = \frac{R4}{R3},$$

potentials at points B and D are the same, and current flowing through the galvanometer G is zero, i.e., a pointer of the galvanometer G indicates a zero scale. That is to say, the bridge is in a balance state, thus $$\frac{R1}{R2} = \frac{R4}{R3}$$

is referred to as a bridge balance condition. When the first sensing resistor $R_1$, the second sensing resistor $R_2$, the third sensing resistor $R_3$ and the fourth sensing resistor R4 do not meet the above bridge balance condition, the potentials at the points B and D are unequal. At this moment, the current flowing through the galvanometer G is not zero, i.e., the pointer of the galvanometer G deflects, and a corresponding signal value is output, thereby realizing detection of a pressure applied to the pressure sensor S according to the signal value output by the galvanometer G.

Figure 6:
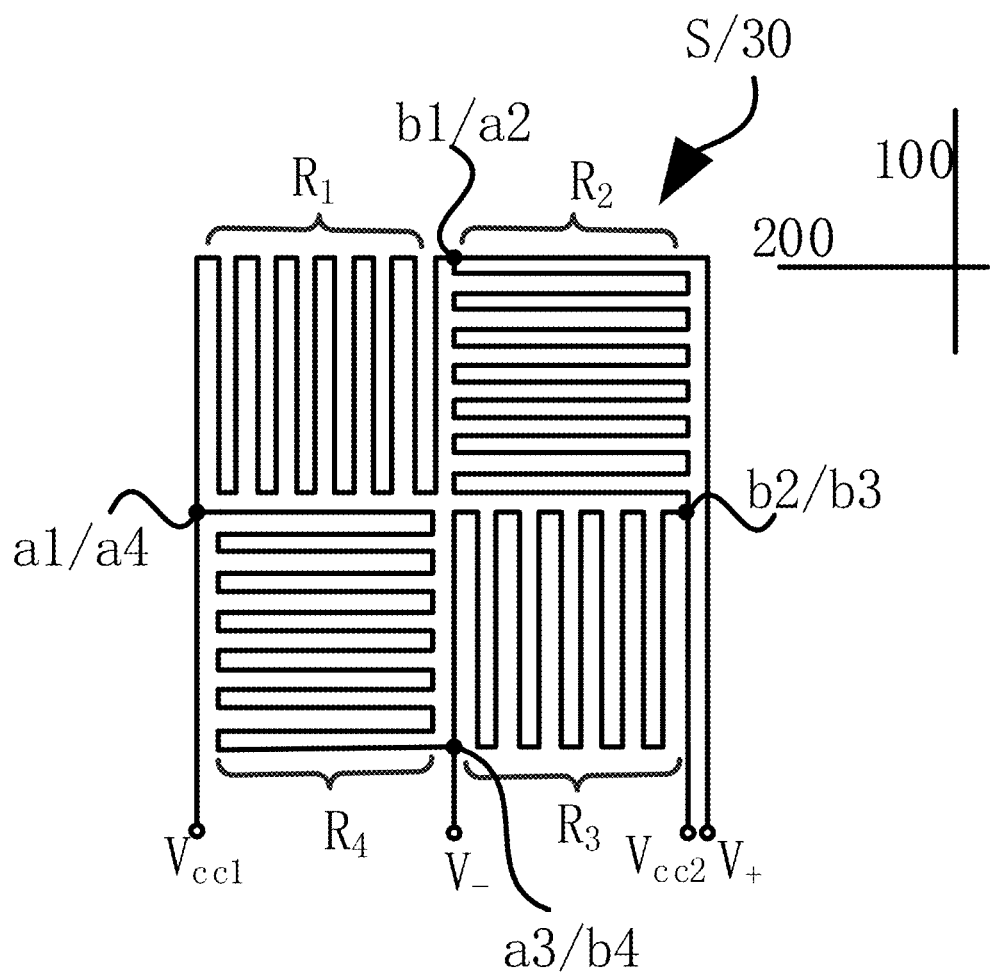
FIG. 6 is a schematic diagram illustrating a structure of a sensing resistor of another pressure sensor provided by embodiments of the present disclosure.

FIG. 6 is a schematic diagram illustrating a structure of a sensing resistor of another pressure sensor provided by embodiments of the present disclosure. On the basis of the structure of the sensing resistor 30 of the pressure sensor S shown in FIG. 5, a first extension direction 100 and a second extension direction 200 are crosswise set. Optionally, as shown in FIG. 6, the first extension direction 100 is perpendicular to the second extension direction 200. An extension length of the first sensing resistor R1 from the first end "a1" to the second end "b1" has a greater component in the first extension direction 100 than a component in the second extension direction 200. An extension length of the second sensing resistor R2 from the first end "a2" to the second end "b2" has a greater component in the second extension direction 200 than a component in the first extension direction 100. An extension length of the third sensing resistor R3 from the first end "a3" to the second end "b3" has a greater component in the first extension direction 100 than a component in the second extension direction 200. An extension length of the fourth sensing resistor R4 from the first end "a4" to the second end "b4" has a greater component in the second extension direction 200 than a component in the first extension direction 100.

According to the sensing resistor 30 of the pressure sensor S with a structure shown in FIG. 6, after electric signals are applied to the first sensing resistor $R_1$, the second sensing resistor $R_2$, the third sensing resistor $R_3$ and the fourth sensing resistor $R_4$ through the first power input terminal "$V_{cc1}$" and the second power input terminal "$V_{cc2}$", the pressure sensing bridge meets the bridge balance condition when no pressure is applied, that is, the bridge is in a balanced state, and the signal value output between the first sensing signal measurement terminal "$V_+$" and the second sensing signal measurement terminal "$V_-$" is zero. When a pressure is applied to the touch display panel, a strain in the first extension direction 100 is sensed by the first sensing resistor $R_1$ and the third sensing resistor $R_3$ so that corresponding resistance values of the first sensing resistor $R_1$ and the third sensing resistor $R_3$ change accordingly, and a strain in the second extension direction 200 is sensed by the second sensing resistor $R_2$ and the fourth sensing resistor $R_4$ so that corresponding resistance values of the second sensing resistor $R_2$ and the fourth sensing resistor $R_4$ change accordingly.

However, the strains in the first extension direction 100 and the second extension direction 200 are different, and resistance value changes of $R_1$ and $R_2$ are different and resistance value changes of the $R_3$ and $R_4$ are different. At this moment, the pressure sensing bridge does not meet the bridge balance condition and loses balance. Therefore, the signal value output between the first sensing signal measurement terminal "$V_+$" and the second sensing signal measurement terminal "$V_-$" is not zero, and the pressure applied to the sensing resistor 30 of the pressure sensor S can be obtained based on the signal value, thereby realizing a pressure sensing function of the touch display panel.

The sensing resistor 30 of the pressure sensor S shown in FIG. 5 generally requires that the deformations suffered by the first sensing resistor $R_1$, the second sensing resistor $R_2$, the third sensing resistor $R_3$ and the fourth sensing resistor $R_4$ are different. For example, the first sensing resistor $R_1$ and the third sensing resistor $R_3$ suffer compressive deformation, and the second sensing resistor $R_2$ and the fourth sensing resistor $R_4$ suffer tensile deformation. Therefore, the first sensing resistor $R_1$, the second sensing resistor $R_2$, the third sensing resistor $R_3$ and the fourth sensing resistor $R_4$ are spatially separated. When a local temperature is changed, the first sensing resistor $R_1$, the second sensing resistor $R_2$, the third sensing resistor $R_3$ and the fourth sensing resistor $R_4$ are in different temperature environments. Thus, the temperature has different influences on the first sensing resistor $R_1$, the second sensing resistor $R_2$, the third sensing resistor $R_3$ and the fourth sensing resistor $R_4$, thereby influencing accuracy of pressure detection performed by the sensing resistor of the pressure sensor S. Compared with the sensing resistor 30 of the pressure sensor S with the structure shown in FIG. 5, the sensing resistor 30 of the pressure sensor S with the structure shown in FIG. 6, the first sensing resistor $R_1$ and the third sensing resistor $R_3$ are configured to sense the deformation in the first extension direction 100, and the second sensing resistor $R_2$ and the fourth sensing resistor $R_4$ are configured to sense the deformation in the second extension direction 200, so that the first sensing resistor $R_1$, the second sensing resistor $R_2$, the third sensing resistor $R_3$ and the fourth sensing resistor $R_4$ may be distributed in the same space, or distributed in a small region. The first sensing resistor $R_1$, the second sensing resistor $R_2$, the third sensing resistor $R_3$ and the fourth sensing resistor $R_4$ are enabled to have synchronous temperature changes, thereby eliminating influences of temperature difference and increasing accuracy of pressure sensing performed by the touch display panel.

By taking the sensing resistor 30 of the Wheatstone bridge type pressure sensor S shown in FIG. 6 as an example, partial steps in a manufacturing process of the array substrate are described in combination with the top views 7a-7f.

Figure 7A:
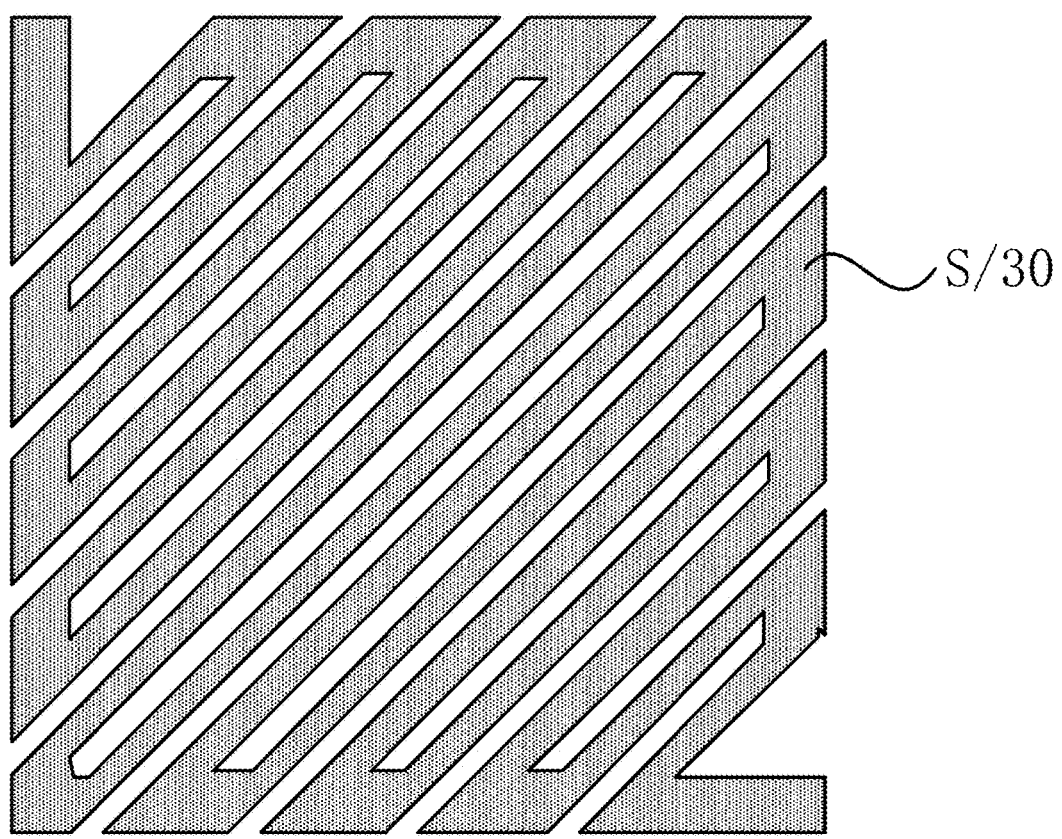
FIG. 7a is a schematic top diagram illustrating a structure of a sensing resistor of an array substrate corresponding to a step in FIG. 1.
Figure 7B:
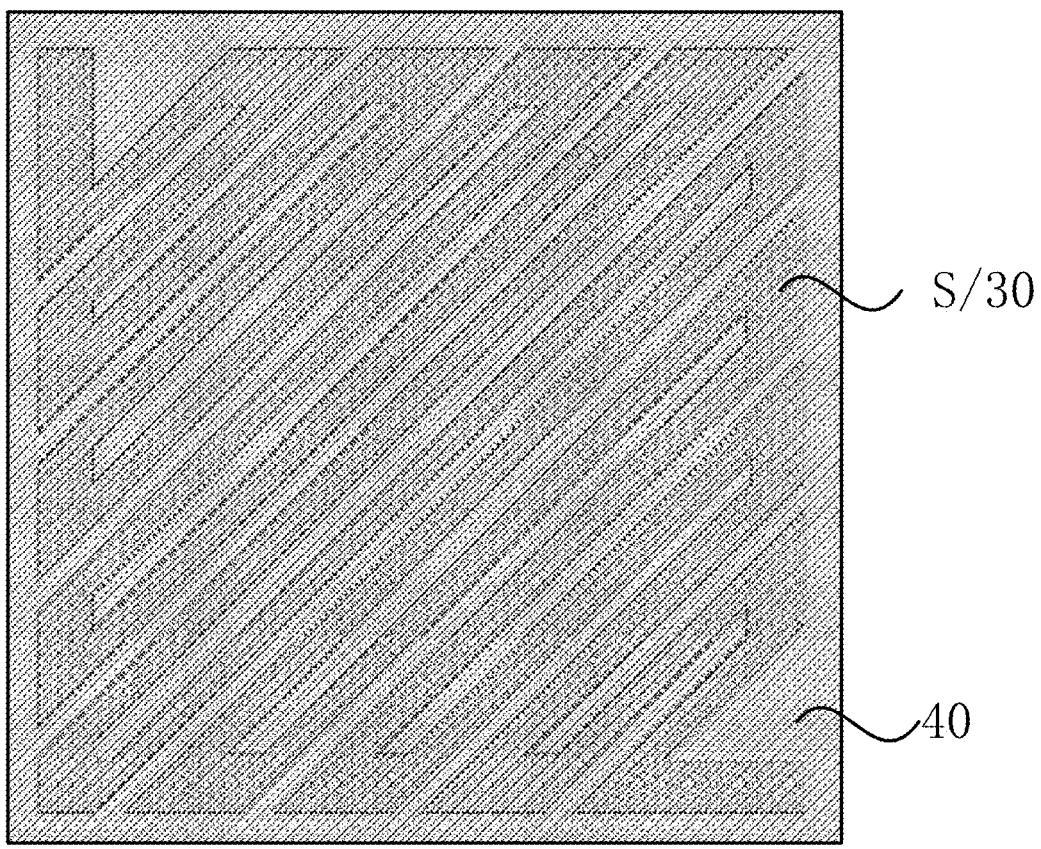
FIG. 7b is a schematic top diagram illustrating a structure of a sensing resistor of an array substrate corresponding to a step in FIG. 1.
Figure 7C:
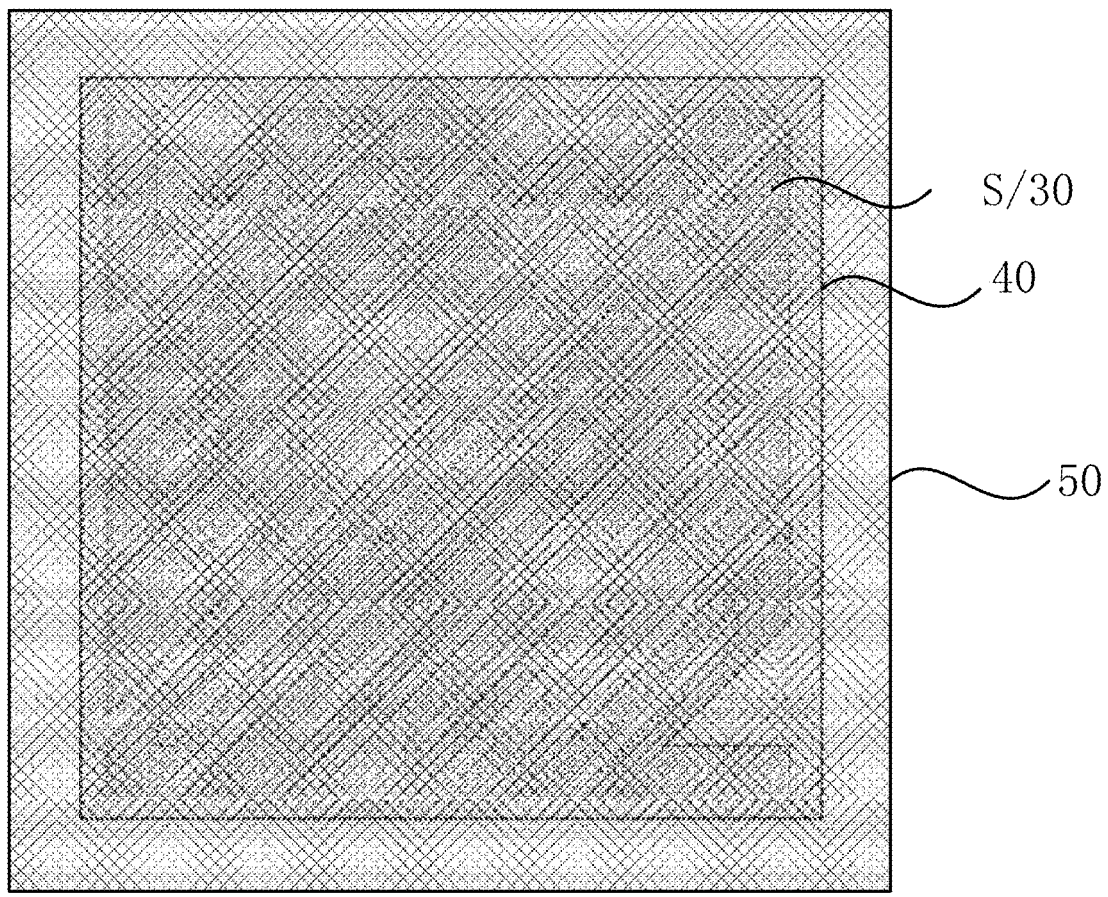
FIG. 7c is a schematic top diagram illustrating a structure of a sensing resistor of an array substrate corresponding to a step in FIG. 1.
Figure 7D:
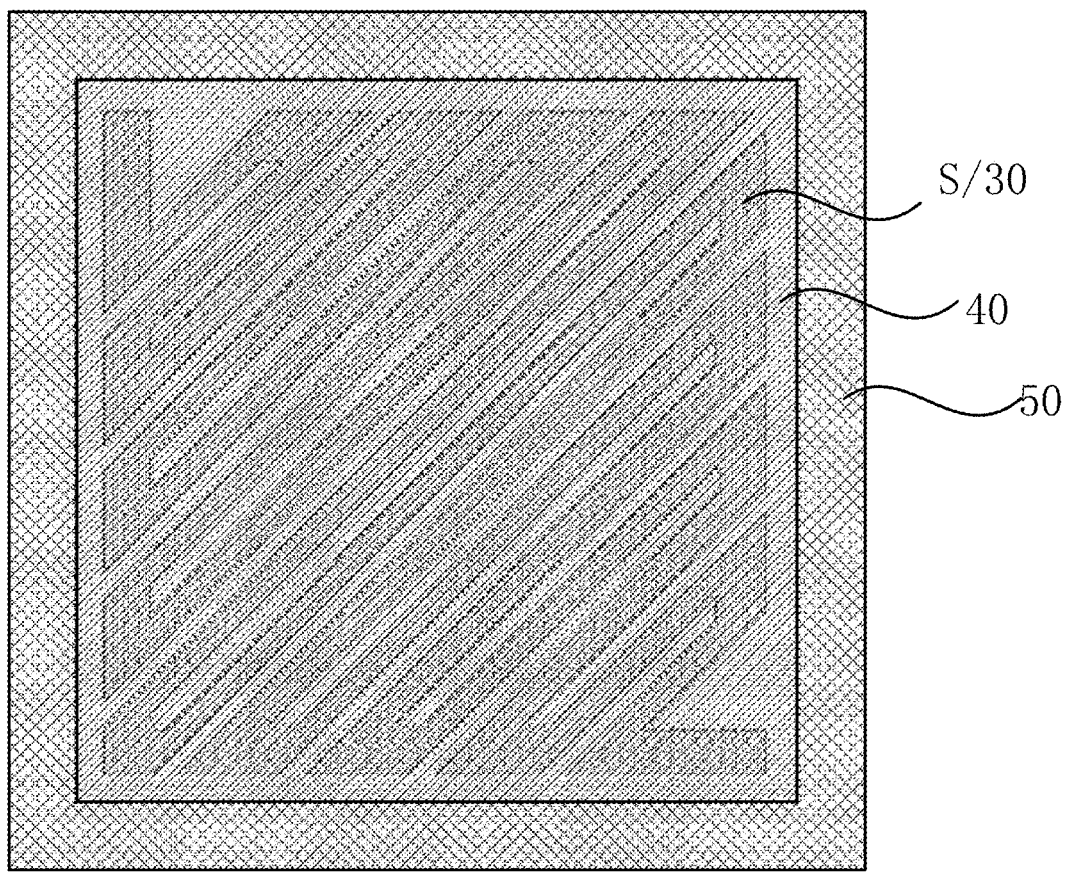
FIG. 7d is a schematic top diagram illustrating a structure of a sensing resistor of an array substrate corresponding to a step in FIG. 1.
Figure 7E:
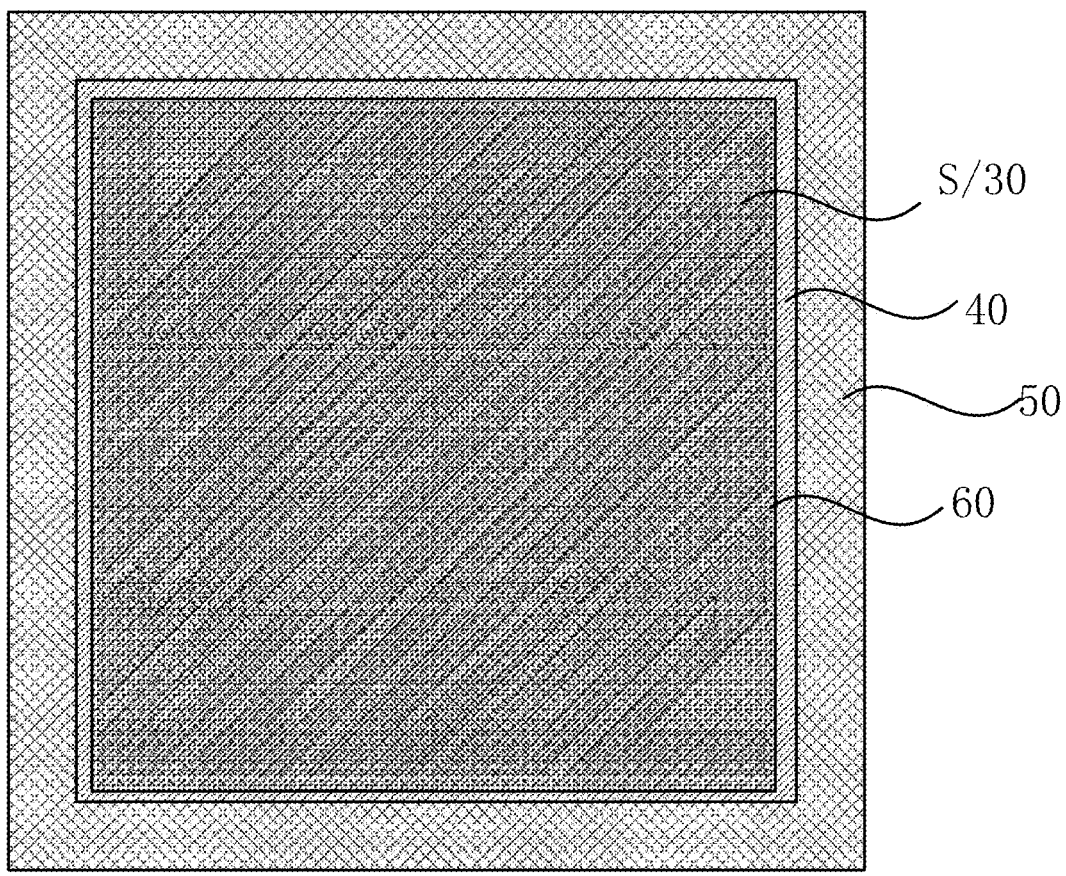
FIG. 7e is a schematic top diagram illustrating a structure of a sensing resistor of an array substrate corresponding to a step in FIG. 1.
Figure 7F:
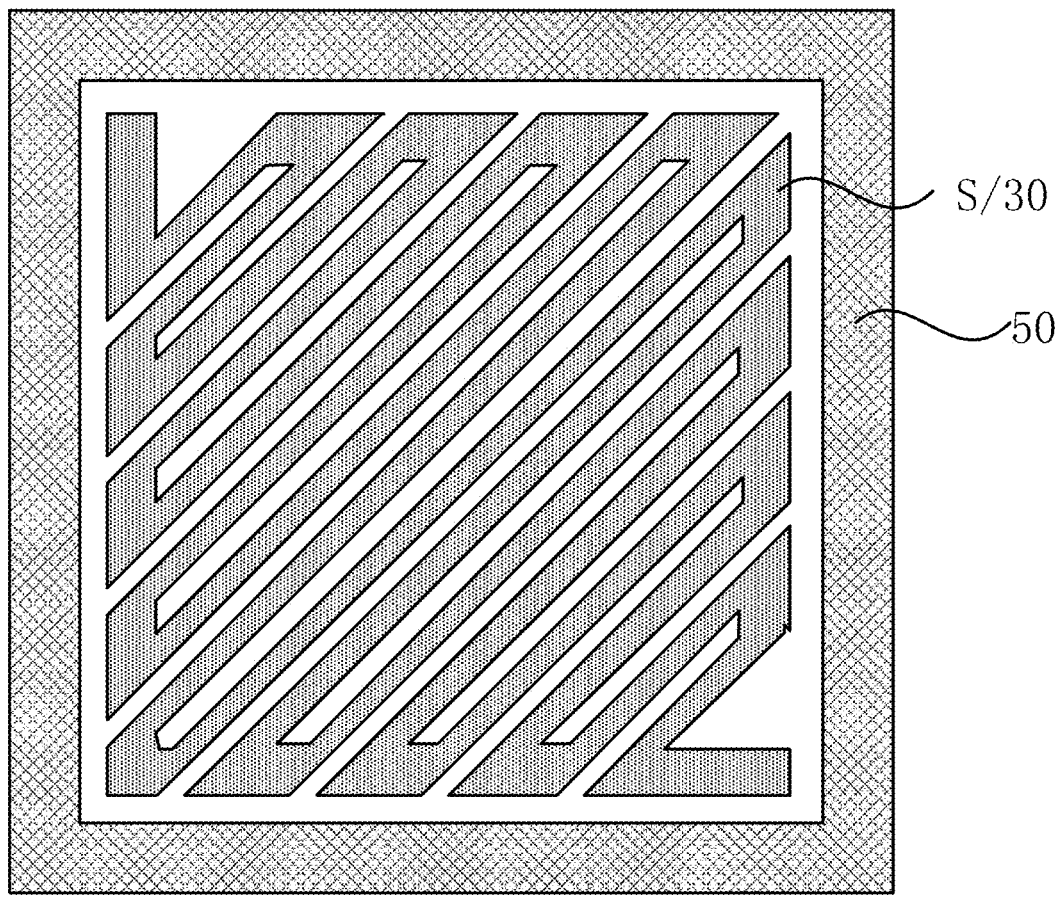
FIG. 7f is a schematic top diagram illustrating a structure of a sensing resistor of an array substrate corresponding to a step in FIG. 1.

With reference to FIG. 7a, the sensing resistor 30 of the pressure sensor S is formed. With reference to FIG. 7b, the first electrode layer 40 covering the sensing resistor 30 of the pressure sensor S is formed, and this part of the first electrode layer 40 is reserved to still cover the sensing resistor 30 after the first doped layer in the active layer of the thin film transistor is etched. With reference to FIG. 7c, the second insulating layer 50 is formed, and covers the part, which is overlapped with the sensing resistor 30 of the pressure sensor S, of the first electrode layer 40. With reference to FIG. 7d, the part, which is overlapped with the sensing resistor 30, of the second insulating layer 50 is etched to expose the first electrode layer 40 covering the sensing resistor 30. With reference to FIG. 7e, the second electrode layer 60 is formed. Since the part, which is overlapped with the sensing resistor 30, of the second insulating layer 50 is etched off in the step shown in FIG. 7d to expose the first electrode layer 40 covering the sensing resistor 30, the second electrode layer 60 is contacted with the first electrode layer 40 at a position corresponding to the sensing resistor 30 in the step shown in FIG. 7e. It should be noted that, to clearly reflect a position relationship between the first electrode layer 40 and the second electrode layer 60, the area of the second electrode layer 60 is drawn to be smaller than the area of the first electrode layer 40 at the position corresponding to the sensing resistor 30 in FIG. 7e. Those skilled in the art can understand that the area of the second electrode layer 60 is the same as that of the first electrode layer 40 at the position corresponding to the sensing resistor 30. With reference to FIG. 7f, the sensing resistor 30 is exposed rather than being covered by the second insulating layer 50 after the part, which is overlapped with the sensing resistor 30, of the first electrode layer 40 and the part, which is overlapped with the sensing resistor 30, of the second electrode layer 60 are etched off. Compared with the existing art, one mask process during manufacture of the display panel is omitted with the first electrode layer 40, and the manufacturing process of the touch display panel is simplified and the manufacturing cost of the touch display panel is reduced while ensuring that the pressure sensor S in the display panel can normally work.

In one embodiment, the sensing resistor of the pressure sensor may be block-shaped and is made of semiconductor materials, and the shape of the sensing resistor is a polygon including at least four edges. The sensing resistor may include a first connecting end, a second connecting end, a third connecting end and a fourth connecting end. The first connecting end is electrically connected with the first power input terminal. The second connecting end is electrically connected with the second power input terminal. The third connecting end is electrically connected with the first sensing signal measurement terminal. The fourth connecting end is electrically connected with the second sensing signal measurement terminal. The first connecting end, the second connecting end, the third connecting end and the fourth connecting end are respectively arranged on the four edges of the polygon. The edge on which the first connecting end is positioned is not connected with the edge on which the second connecting end is positioned; and the edge on which the third connecting end is positioned is not connected with the edge on which the fourth connecting end is positioned. In one embodiment, the sensing resistor of the pressure sensor is a quadrangle as described in FIG. 8. However, the shape of the sensing resistor of the pressure sensor is not limited in embodiments of the present disclosure.

Figure 8:
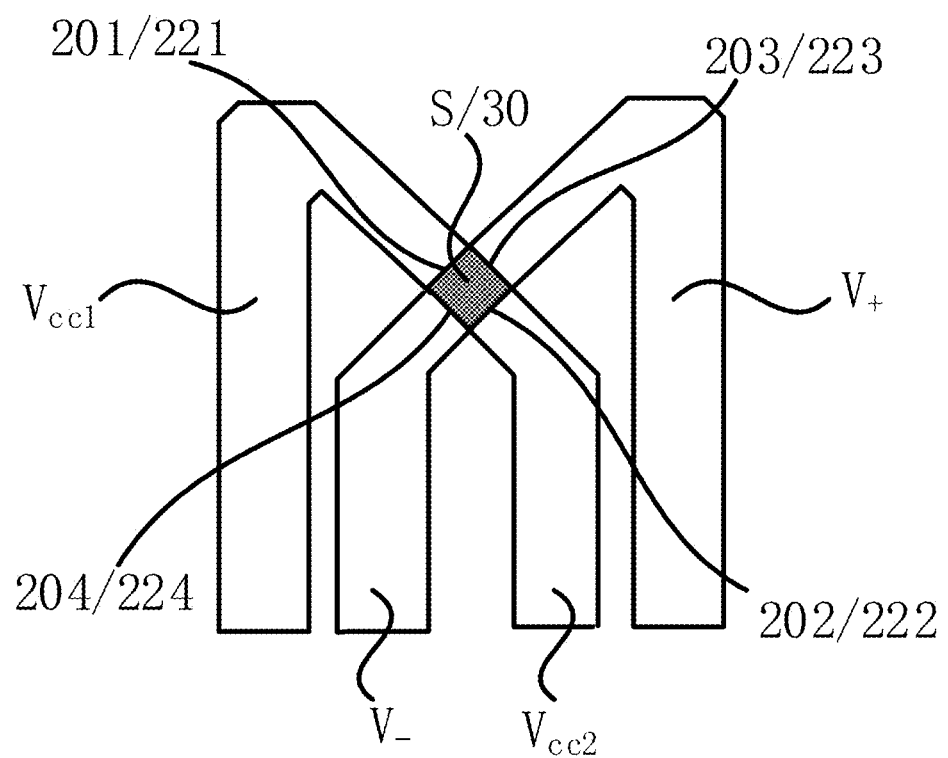
FIG. 8 is a schematic diagram illustrating a structure of a sensing resistor of another pressure sensor provided by embodiments of the present disclosure.

In one embodiment, as shown in FIG. 8, the sensing resistor 30 of the pressure sensor S may be the quadrangle. The first connecting end 201, the second connecting end 202, the third connecting end 203 and the fourth connecting end 204 refer to a first edge 221, a second edge 222, a third edge 223 and a fourth edge 224 of the sensing resistor 30 of the pressure sensor S respectively. The first edge 221 and the second edge 222 of the sensing resistor 30 of the pressure sensor S are arranged opposite to each other. The third edge 223 and the fourth edge 224 of the sensing resistor 30 of the pressure sensor S are arranged opposite to each other. The first connecting end 201 is electrically connected with the first power input terminal "$V_{cc1}$"; the second connecting end 202 is electrically connected with the second power input terminal "$V_{cc2}$"; the third connecting end 203 is electrically connected with the first sensing signal measurement terminal "$V_+$"; and the fourth connecting end 204 is electrically connected with the second sensing signal measurement terminal "$V_-$".

Specifically, the first power input terminal "$V_{cc1}$" and the second power input terminal "$V_{cc2}$" are used to apply a bias voltage to the sensing resistor 30 of the pressure sensor S through the first connecting end 201 and the second connecting end 202 of the sensing resistor 30 of the pressure sensor S. When the touch display panel is pressed by a pressure, a resistance value of the sensing resistor 30 of the pressure sensor S is changed. Accordingly, strain voltages output by corresponding first sensing signal measurement terminal "$V_+$" and second sensing signal measurement terminal "$V_-$" are changed. Therefore, the pressure applied to the pressure sensor S can be detected by detecting a change of the voltage on the sensing resistor 30, thereby realizing the pressure sensing function of the touch display panel.

Figure 9:
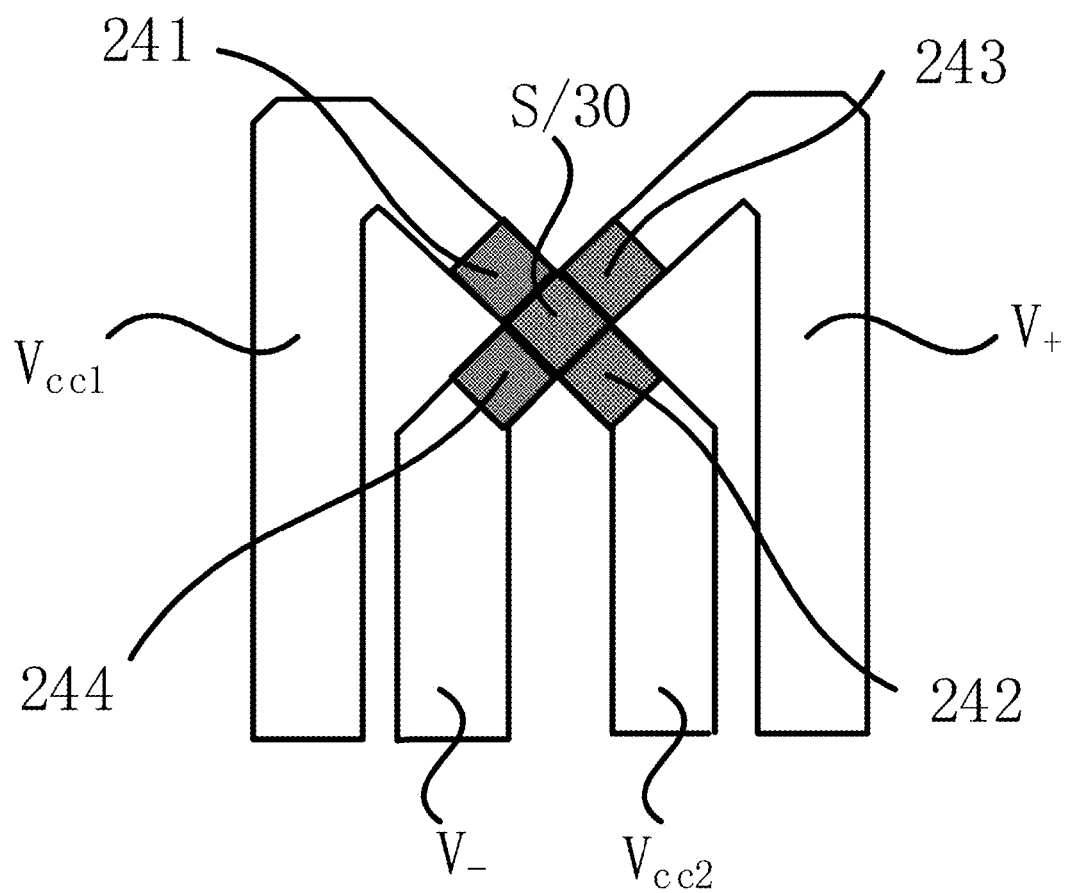
FIG. 9 is a schematic diagram illustrating a structure of a sensing resistor of another pressure sensor provided by embodiments of the present disclosure.

The pressure sensor may be block-shaped and made of semiconductor materials. The pressure sensor includes an polygonal intrinsic part having at least four edges, as well as a first protrusion part, a second protrusion part, a third protrusion part and a fourth protrusion part respectively arranged on the four edges of the polygon. The edge on which the first protrusion part is positioned is not connected with the edge on which the second protrusion part is positioned, and the edge on which the third protrusion part is positioned is not connected with the edge on which the fourth protrusion part is positioned. The first protrusion part is electrically connected with the first power input terminal; the second protrusion part is electrically connected with the second power input terminal; the third protrusion part is electrically connected with the first sensing signal measurement terminal; and the fourth protrusion part is electrically connected with the second sensing signal measurement terminal. In one embodiment, the sensing resistor 30 of the pressure sensor S is a quadrangle for description in FIG. 9. However, the shape of the sensing resistor 30 of the pressure sensor S is not limited in embodiments of the present disclosure. FIG. 9 is different from FIG. 8 in that the first connecting end 201, the second connecting end 202, the third connecting end 203 and the fourth connecting end 204 are respectively and independently arranged as protrusion parts on the four edges of the sensing resistor 30 of the quadrangular pressure sensor S. The first protrusion part 241 is electrically connected with the first power input terminal "$V_{cc1}$"; the second protrusion part 242 is electrically connected with the second power input terminal "$V_{cc2}$"; the third protrusion part 243 is electrically connected with the first sensing signal measurement terminal "$V_+$"; and the fourth protrusion part 244 is electrically connected with the second sensing signal measurement terminal "$V_-$". A principle for performing pressure detection in FIG. 9 is the same as a detection principle of the pressure sensor S shown in FIG. 8, and unnecessary details are avoided herein.

In one embodiment, the first protrusion part 241, the second protrusion part 242, the third protrusion part 243 and the fourth protrusion part 244 and strain resistor slices 211 of the pressure sensor S are made of the same material, so that a Schottky barrier between the first protrusion part 241, the second protrusion part 242, the third protrusion part 243 and the fourth protrusion part 244 and the sensing resistor 30 of the pressure sensor S can be effectively decreased, thereby further increasing detection accuracy of the pressure sensor S.

Figure 10:
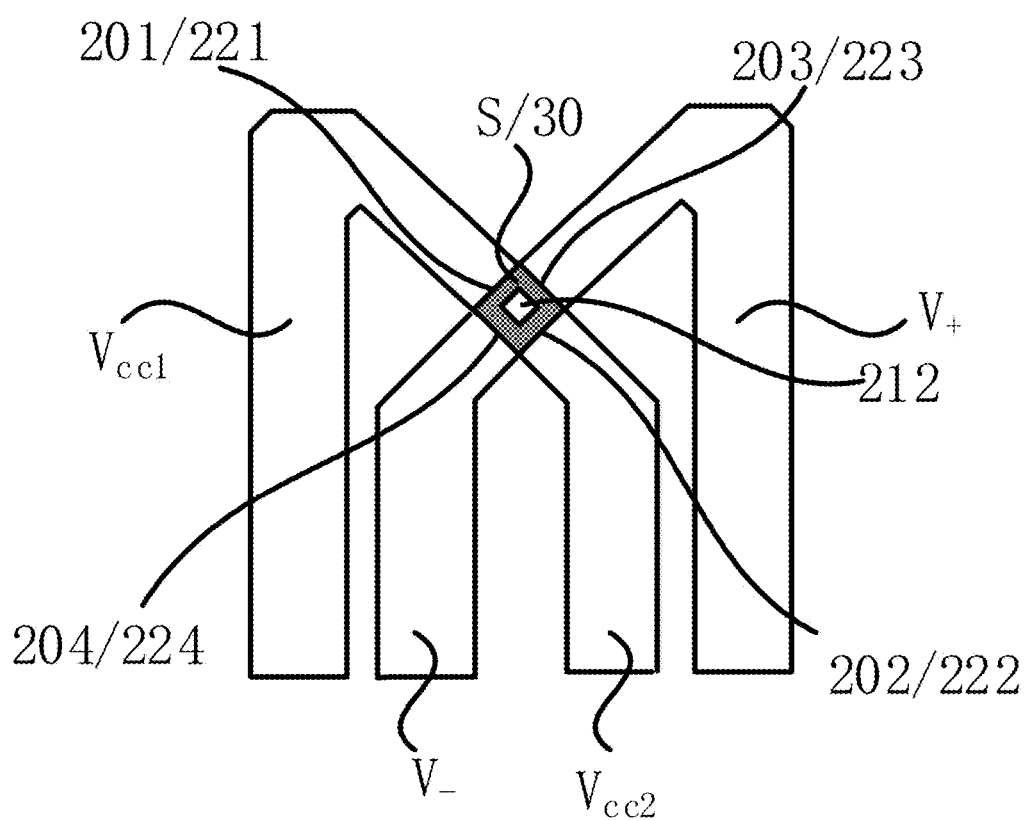
FIG. 10 is a schematic diagram illustrating a structure of a sensing resistor of another pressure sensor provided by embodiments of the present disclosure.

FIG. 10 is a schematic diagram illustrating a structure of another pressure sensor provided by embodiments of the present disclosure. On the basis of the structure of the sensing resistor 30 of the pressure sensor S shown in FIG. 8, a hollow region 212 is formed on the sensing resistor 30 of the pressure sensor S in FIG. 10. Since the sensing resistor 30 of the pressure sensor S is a full-slice resistor, through the arrangement of the hollow region 212, a conducting area of the sensing resistor 30 is decreased, i.e., a resistance of the sensing resistor 30 of the pressure sensor S is increased. For the array substrate in which the sensing resistor 30 of the pressure sensor S with the structure shown in FIG. 8-FIG 10 is arranged, one mask process during the manufacture of the display panel is omitted with the first electrode layer 40 in the manufacturing process, and the manufacturing process of the touch display panel is simplified and the manufacturing cost of the touch display panel is reduced while ensuring that the pressure sensor S in the display panel can normally work.

It should be noted that the drawings in embodiments of the present disclosure only exemplarily indicate a size of each element and a thickness of each film rather than representing actual sizes of each element and each film in the display panel.

According to embodiments of the present disclosure, the sensing resistor 30 of the pressure sensor S and the active layer 203 of the thin film transistor 20 are manufactured on the same layer. In the manufacturing process of the array substrate, the first electrode layer 40 is formed to cover the sensing resistor 30 of the pressure sensor S before etching the part, which is not overlapped with the source 204 and the drain 205, of the first doped layer 2031, so that the first electrode layer 40 performs the function of blocking etching the first doped layer 2031 in the sensing resistor 30 of the pressure sensor S when the part, which is not overlapped with the source and the drain, of the first doped layer 2031 is etched. Moreover, the first electrode layer 40 covering the sensing resistor 30 of the pressure sensor S can be etched off when the second electrode layer 60 is etched, thereby preventing the second doped layer 301 in the sensing resistor 30 of the pressure sensor S from being etched without using additional mark process. Compared with the existing art, one mask process during the manufacture of the display panel is omitted with the first electrode layer 40, and the manufacturing process of the touch display panel is simplified and the manufacturing cost of the touch display panel is reduced while ensuring that the pressure sensor S in the display panel can normally work.

Figure 11:
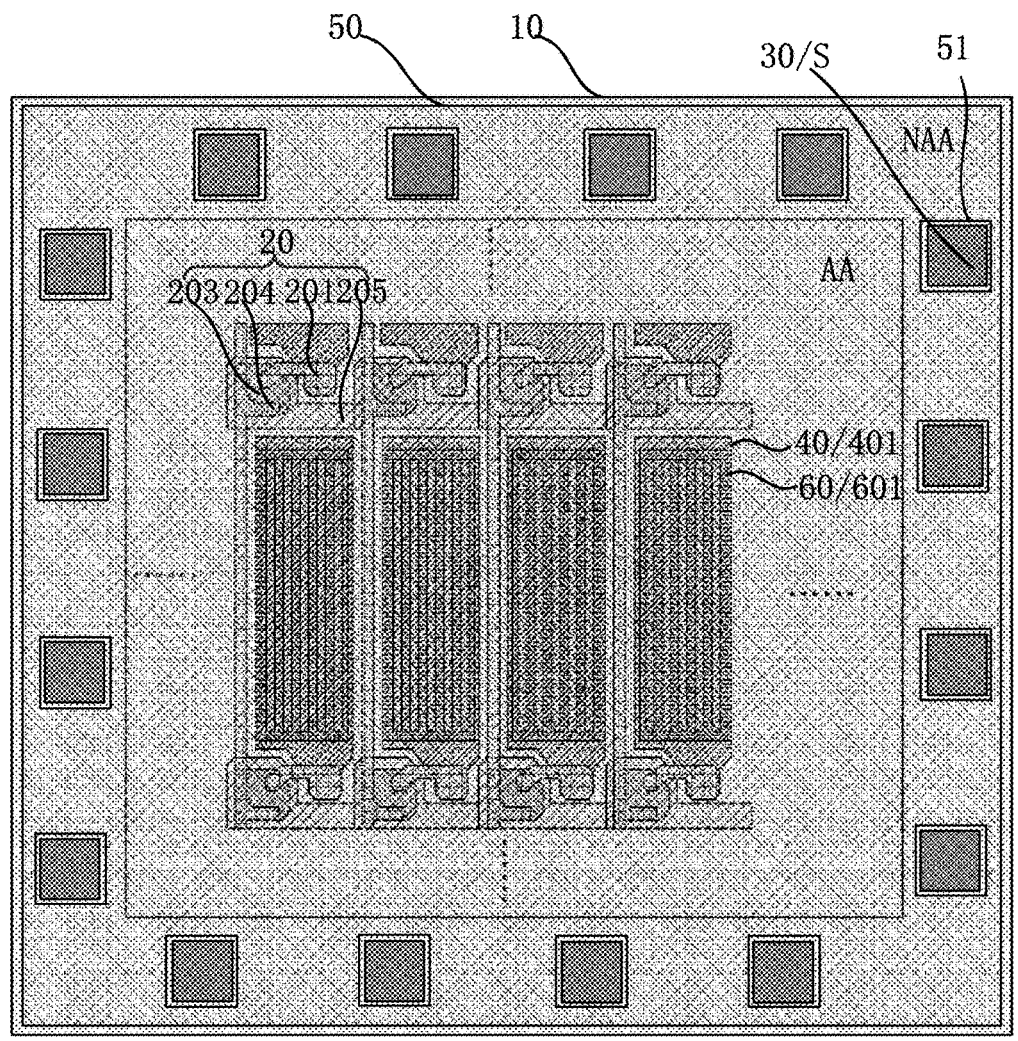
FIG. 11 is a schematic top diagram illustrating a structure of an array substrate provided by embodiments of the present disclosure.

Embodiments of the present disclosure further provide an array substrate. FIG. 11 is a schematic top diagram illustrating a structure of the array substrate provided by embodiments of the present disclosure. In combination with FIG. 11 and FIG. 2j, the array substrate includes a substrate 10, a plurality of thin film transistors 20 positioned on the substrate 10, a second insulating layer 50 covering the sources 204 and the drains 205 of the thin film transistors 20, a plurality of pressure sensors S positioned on the substrate 10, a first electrode layer 40, and a second electrode layer 60 positioned on one side, which is facing away from the substrate 10, of the second insulating layer 50. Each of the thin film transistors 20 includes the gate 201, the first insulating layer 202 (not shown in FIG. 11), the active layer 203 as well as the source 204 and the drain 205 manufactured on the same layer in the direction facing away from the substrate 10. Each of the pressure sensors S includes a sensing resistor 30. The sensing resistor 30 and the active layer 203 are manufactured on the same layer. In the direction facing away from the substrate 10, the active layer 203 includes a first doped layer 2031 and the first intrinsic layer 2032, and the sensing resistor 30 includes the second doped layer 301 and the second intrinsic layer 302. The first doped layer 2031 and the second doped layer 301 are positioned on the same layer, and the first intrinsic layer 2032 and the second intrinsic layer 302 are positioned on the same layer; and the first electrode layer 40 is positioned between the first insulating layer 202 and the second insulating layer 50. The second insulating layer 50 has a through hole 51, and the vertical projection of the sensing resistor 30 is positioned in the vertical projection of the through hole 51 on the substrate 10. Only part of structure of the display region AA of the touch display panel is exemplarily drawn in FIG. 11.

The sensing resistor 30 of the pressure sensor S in the array substrate provided by embodiments of the present disclosure is not covered by the second insulating layer 50, i.e., the sensing resistor 30's vertical projection on the substrate 10 is positioned in the vertical projection of the through hole 51 on the substrate 10. Compared with the existing art, since the sensing resistor 30 of the pressure sensor S is covered by the first electrode layer 40, the first electrode layer 40 performs the function of blocking etching the pressure sensor S when the part, which is not overlapped with the source 204 and the drain 205, of the first doped layer 2031 on the active layer 203 is etched. Moreover, in a subsequent manufacturing process, the through hole is formed in a position, which corresponds to the sensing resistor 30, of the second insulating layer 50, so that the part overlapped with the sensing resistor 30 of the pressure sensor S covers the first electrode layer 40 and the second electrode layer 60 of the sensing resistor 30. Compared with the existing art, one mask process during the manufacture of the display panel is omitted with the first electrode layer 40, and the manufacturing process of the touch display panel is simplified and the manufacturing cost of the touch display panel is reduced while ensuring that the pressure sensor S in the display panel can normally work.

Figure 12:
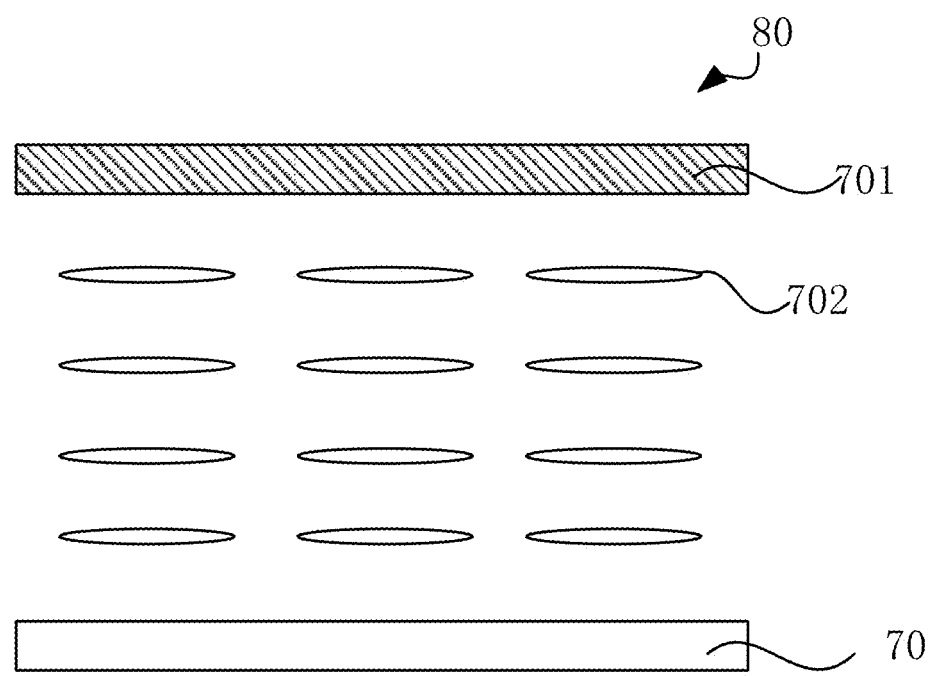
FIG. 12 is a schematic diagram illustrating a structure of a touch display panel provided by embodiments of the present disclosure.

Embodiments of the present disclosure further provide a touch display panel. FIG. 12 is a schematic diagram illustrating a structure of a touch display panel provided by embodiments of the present disclosure. As shown in FIG. 12, the touch display panel 80 includes the array substrate 70 of the above embodiments. Exemplarily, the touch display panel 80 is a liquid crystal display panel, and further includes a color filter substrate 701 arranged opposite to the array substrate 70, and a liquid crystal layer 702 positioned between the array substrate 70 and the color filter substrate 701. The touch display panel 80 provided by embodiments of the present disclosure also has beneficial effects described in the above embodiments, and unnecessary details are avoided herein.

Exemplarily, the touch display panel may also be an organic light-emitting display panel. Then, the touch display panel may include the array substrate in the above embodiments, as well as an organic light-emitting structure and an encapsulating layer positioned on the array substrate, and the like. The touch display panel also has the beneficial effects described in the above embodiments, and the unnecessary details are avoided herein. Exemplarily, the touch display panel can also be an electrophoretic display panel, which is not limited in embodiments of the present disclosure.

It should be noted that only one of the first electrode layer 40 and the second electrode layer 60 in the array substrate in the above embodiments is a pixel electrode and the other one is not a common electrode when the touch display panel is the electrophoretic display panel or a liquid crystal display panel in a vertical electric field mode. If the touch display panel is the organic light-emitting display panel or a liquid crystal display panel in an in-plane electric field mode, optionally, one of the first electrode layer 40 and the second electrode layer 60 in the array substrate in the above embodiments is the pixel electrode and the other one is the common electrode.

Figure 13:
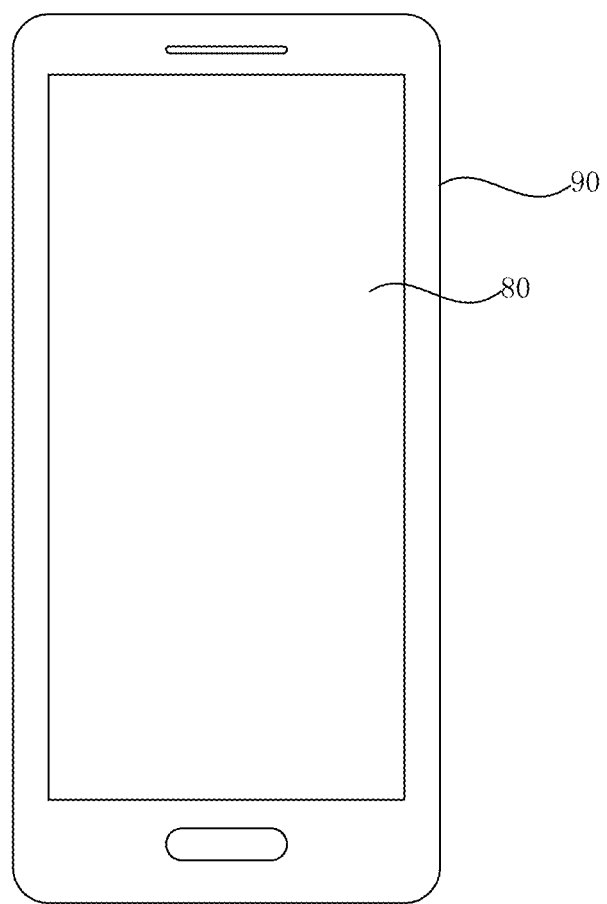
FIG. 13 is a schematic diagram illustrating a structure of a touch display apparatus provided by embodiments of the present disclosure.

Embodiments of the present disclosure further provide a touch display apparatus. FIG. 13 is a schematic diagram illustrating a structure of a touch display apparatus provided by embodiments of the present disclosure. As shown in FIG. 13, the touch display apparatus 90 includes the touch display panel 80 in the above embodiment. Therefore, the touch display apparatus 90 provided by embodiments of the present disclosure also has the beneficial effects described in the above embodiments, and the unnecessary details are avoided herein. Exemplarily, the touch display apparatus 90 may be a mobile phone, a computer, a television or any other electronic display device.

It should be noted that the above contents are only preferred embodiments of the present disclosure and used technical principles. It can be understood for those skilled in the art that the present disclosure is not limited to specific embodiments described herein. For those skilled in the art, the present disclosure can be subject to various apparent variations, readjustments and replacements without departing from a protection scope of the present disclosure. Therefore, although the present disclosure is described in detail through above embodiments, the present disclosure is not only limited to above embodiments. The present disclosure can also include more other equivalent embodiments without deviating from conceptions of the present disclosure. A scope of the present disclosure is determined by a scope of attached claims.

What is claimed is:

1. A manufacturing method of an array substrate, comprising:
    providing a substrate;
    forming a gate of a thin film transistor on the substrate;
    forming a first insulating layer covering the gate;
    forming an active layer of the thin film transistor and a sensing resistor of a pressure sensor, wherein the sensing resistor and the active layer are manufactured on the same layer, in a direction facing away from the substrate, wherein the active layer comprises a first doped layer and a first intrinsic layer, and the sensing resistor comprises a second doped layer and a second intrinsic layer, wherein the first doped layer and the second doped layer are manufactured on the same layer, and the first intrinsic layer and the second intrinsic layer are manufactured on the same layer;
    forming a first electrode layer covering the sensing resistor;
    forming a source and a drain of the thin film transistor;
    etching a part, which is not overlapped with the source and the drain of the thin film transistor, of the first doped layer, and reserving the first electrode layer to cover the sensing resistor;
    forming a second insulating layer covering the source and the drain;
    etching a part, which is overlapped with the sensing resistor, of the second insulating layer, to expose the first electrode layer covering the sensing resistor; and
    forming a second electrode layer, and etching a part, which is overlapped with the sensing resistor and the first electrode layer and etching a part, which is overlapped with the sensing resistor, of the second electrode layer, to expose the sensing resistor.

2. The manufacturing method according to claim 1, wherein etching a part, which is not overlapped with the source and the drain of the thin film transistor, of the first doped layer is executed through a dry etching process.

3. The manufacturing method according to claim 1, wherein etching a part, which is overlapped with the sensing resistor, of the first electrode layer and etching a part, which is overlapped with the sensing resistor, of the second electrode layer are executed through a wet etching process.

4. The manufacturing method according to claim 1, wherein a part being etched of the second insulating layer has a vertical projection on the substrate, and the vertical projection covers a vertical projection of the sensing resistor on the substrate.

5. The manufacturing method according to claim 1, wherein materials forming the sensing resistor and the active layer of the thin film transistor comprise amorphous silicon materials.

6. The manufacturing method according to claim 1, wherein each of the first doped layer and the second doped layer is an N-type semiconductor layer.

7. The manufacturing method according to claim 1, wherein the substrate comprises a display region and a peripheral circuit region surrounding the display region; wherein
    the array substrate comprises a plurality of thin film transistors and at least one pressure sensor; the thin film transistors are positioned in at least one of the display region and the peripheral circuit region; and the at least one pressure sensor is positioned in the peripheral circuit region.

8. The manufacturing method according to claim 1, wherein the first electrode layer is a pixel electrode layer and comprises a plurality of first electrodes, and each of the first electrodes is electrically connected with the drain of a corresponding thin film transistor directly.

9. The manufacturing method according to claim 1, wherein the second electrode layer is a pixel electrode layer and comprises a plurality of second electrodes, and each of the second electrodes is electrically connected with the drain of a corresponding thin film transistor by a through hole penetrating the second insulating layer.

10. The manufacturing method according to claim 1, wherein the sensing resistor comprises a first sensing sub-resistor, a second sensing sub-resistor, a third sensing sub-resistor and a fourth sensing sub-resistor,
    wherein a first end of the first sensing sub-resistor and a first end of the fourth sensing sub-resistor are electrically connected with a first power input terminal; a second end of the first sensing sub-resistor and a first end of the second sensing sub-resistor are electrically connected with a first sensing signal measurement terminal; a second end of the fourth sensing sub-resistor and a first end of the third sensing sub-resistor are electrically connected with a second sensing signal measurement terminal; and a second end of the second sensing sub-resistor and a second end of the third sensing sub-resistor are electrically connected with a second power input terminal.

11. The manufacturing method according to claim 10, wherein an extension length from the first end to the second end of the first sensing sub-resistor has a greater component in a first extension direction than a component in a second extension direction; an extension length from the first end to the second end of the second sensing sub-resistor has a greater component in the second extension direction than a component in the first extension direction; an extension length from the first end to the second end of the third sensing sub-resistor has a greater component in the first extension direction than a component in the second extension direction; and an extension length from the first end to the second end of the fourth sensing sub-resistor has a greater component in the second extension direction than a component in the first extension direction;

wherein the first extension direction and the second extension direction are crosswise set.

12. The manufacturing method according to claim 1, wherein the sensing resistor is block-shaped and is made of semiconductor materials, and the sensing resistor is a polygon having at least four edges; and wherein the sensing resistor comprises a first connecting end, a second connecting end, a third connecting end and a fourth connecting end; the first connecting end is electrically connected with a first power input terminal; the second connecting end is electrically connected with a second power input terminal; the third connecting end is electrically connected with a first sensing signal measurement terminal; the fourth connecting end is electrically connected with a second sensing signal measurement terminal; the first connecting end, the second connecting end, the third connecting end and the fourth connecting end are arranged on the four edges of the polygon respectively; the edge on which the first connecting end is positioned is not connected with the edge on which the second connecting end is positioned; and the edge on which the third connecting end is positioned is not connected with the edge on which the fourth connecting end is positioned.

13. The manufacturing method according to claim 12, wherein a hollow region is formed in the sensing resistor.

14. The manufacturing method according to claim 1, wherein the pressure sensor is block-shaped and is made of semiconductor materials, and the pressure sensor comprises a polygonal intrinsic part having at least four edges as well as a first protrusion part, a second protrusion part, a third protrusion part and a fourth protrusion part respectively arranged on the four edges;

wherein the edge on which the first protrusion part is positioned is not connected with the edge on which the second protrusion part is positioned, and the edge on which the third protrusion part is positioned is not connected with the edge on which the fourth protrusion part is positioned; and the first protrusion part is electrically connected with a first power input terminal; the second protrusion part is electrically connected with a second power input terminal; the third protrusion part is electrically connected with a first sensing signal measurement terminal; and the fourth protrusion part is electrically connected with a second sensing signal measurement terminal.

15. The manufacturing method according to claim 14, wherein materials forming the intrinsic part, the first protrusion part, the second protrusion part, the third protrusion part and the fourth protrusion part are the same.

16. An array substrate, comprising:
a substrate,
a plurality of thin film transistors positioned on the substrate, wherein each of the thin film transistors comprises a gate, a first insulating layer, an active layer as well as a source and a drain in a direction facing away from the substrate, and the source and the drain are manufactured on the same layer;

a second insulating layer covering the source and the drain;

a plurality of pressure sensors positioned on the substrate, wherein each of the pressure sensors comprises a sensing resistor; the sensing resistor and the active layer are manufactured on the same layer; in the direction facing away from the substrate, the active layer comprises a first doped layer and a first intrinsic layer, and the sensing resistor comprises a second doped layer and a second intrinsic layer, wherein the first doped layer and the second doped layer are positioned on the same layer, and the first intrinsic layer and the second intrinsic layer are positioned on the same layer;

a first electrode layer positioned between the first insulating layer and a second insulating layer; and a second electrode layer positioned on one side, facing away from the substrate, of the second insulating layer, wherein the second insulating layer has a through hole, and the sensing resistor's vertical projection on the substrate is positioned in the through hole's vertical projection of on the substrate.

17. A touch display panel having an array substrate, wherein the array substrate comprises:
a substrate,
a plurality of thin film transistors positioned on the substrate, wherein each of the thin film transistors comprises a gate, a first insulating layer, an active layer as well as a source and a drain in a direction facing away from the substrate, and the source and the drain are manufactured on the same layer;

a second insulating layer covering the source and the drain;

a plurality of pressure sensors positioned on the substrate, wherein each of the pressure sensors comprises a sensing resistor; the sensing resistor and the active layer are manufactured on the same layer; in the direction facing away from the substrate, the active layer comprises a first doped layer and a first intrinsic layer, and the sensing resistor comprises a second doped layer and a second intrinsic layer, wherein the first doped layer and the second doped layer are positioned on the same layer, and the first intrinsic layer and the second intrinsic layer are positioned on the same layer;

a first electrode layer positioned between the first insulating layer and a second insulating layer; and a second electrode layer positioned on one side, facing away from the substrate, of the second insulating layer, wherein the second insulating layer has a through hole, and the sensing resistor's vertical projection on the substrate is positioned in the through hole's vertical projection of on the substrate.

18. A touch display apparatus, comprising the touch display panel according to claim 17.

* * * * *